(12) United States Patent
Ridgeway

(10) Patent No.: US 6,470,409 B1
(45) Date of Patent: Oct. 22, 2002

(54) INTERFACE SYSTEM HAVING A PROGRAMMABLE NUMBER OF CHANNELS AND METHODS OF IMPLEMENTING SAME

(75) Inventor: David J. Ridgeway, Los Gatos, CA (US)

(73) Assignee: Xilinx Inc., San Jose, CA (US)

( * ) Notice: Subject to any disclaimer, the term of this patent is extended or adjusted under 35 U.S.C. 154(b) by 882 days.

(21) Appl. No.: 08/757,035

(22) Filed: Nov. 26, 1996

(51) Int. Cl.[7] .............................................. G06F 13/38
(52) U.S. Cl. ........................... 710/305; 710/22; 710/26; 710/8; 710/10
(58) Field of Search ................................ 710/305–317, 710/22, 23, 26, 27, 28, 8, 10, 52, 63, 62

(56) References Cited

U.S. PATENT DOCUMENTS 5,063,494 A * 11/1991 Davidowski et al.
5,179,663 A * 1/1993 Iimura
5,379,395 A * 1/1995 Nakabayashi et al.
5,655,151 A * 8/1997 Bowes et al.

* cited by examiner

*Primary Examiner*—Rupal Dharia
(74) *Attorney, Agent, or Firm*—E. Eric Hoffman; Jeanette S. Harms

(57) ABSTRACT

A multi-channel data transfer circuit and method which provides an interface between a computer system and a multi-channel communication controller. The data transfer circuit is programmable to provide a selectable number of communication channels between the computer system and the communication controller. The data transfer circuit is further programmable to provide a selectable number of entries in each of the communication channels. In a particular embodiment, FIFO memories within the data transfer circuit are logically partitioned to provide the desired number of communication channels and the desired number of entries per channel. The data transfer circuit includes a multi-channel transmit circuit for providing data values from the computer system to the communication controller, and a multi-channel receive circuit for providing data values from the computer communication controller to the computer system. Both the transmit and receive circuits include caching systems to promote burst accesses to the computer system.

26 Claims, 16 Drawing Sheets

| W[4:0] or R[4:0] | 202B |
|---|---|
| 0 0 0 0 0 | CHANNEL_∅_DATA_∅ |
| 0 0 0 0 1 | "          " 1 |
| 0 0 0 1 0 | "          " 2 |
| 0 0 0 1 1 | "          " 3 |
| 0 0 1 0 0 | "          " 4 |
| 0 0 1 0 1 | "          " 5 |
| 0 0 1 1 0 | "          " 6 |
| 0 0 1 1 1 | "          " 7 |
| 0 1 0 0 0 | CHANNEL_1_DATA_∅ |
| 0 1 0 0 1 | "          " 1 |
| 0 1 0 1 0 | "          " 2 |
| 0 1 0 1 1 | "          " 3 |
| 0 1 1 0 0 | "          " 4 |
| 0 1 1 0 1 | "          " 5 |
| 0 1 1 1 0 | "          " 6 |
| 0 1 1 1 1 | "          " 7 |
| 1 0 0 0 0 | CHANNEL_2_DATA_∅ |
| 1 0 0 0 1 | "          " 1 |
| 1 0 0 1 0 | "          " 2 |
| 1 0 0 1 1 | "          " 3 |
| 1 0 1 0 0 | "          " 4 |
| 1 0 1 0 1 | "          " 5 |
| 1 0 1 1 0 | "          " 6 |
| 1 0 1 1 1 | "          " 7 |
| 1 1 0 0 0 | "          " 8 |
| 1 1 0 0 1 | "          " 9 |
| 1 1 0 1 0 | "          " 10 |
| 1 1 0 1 1 | "          " 11 |
| 1 1 1 0 0 | "          " 12 |
| 1 1 1 0 1 | "          " 13 |
| 1 1 1 1 0 | "          " 14 |
| 1 1 1 1 1 | "          " 15 |

FIG. 15

| W[4:0] or R[4:0] | 302B |
|---|---|
| 0 0 0 0 0 | CHANNEL_Ø_DATA_Ø |
| 0 0 0 0 1 | "           " 1 |
| 0 0 0 1 0 | "           " 2 |
| 0 0 0 1 1 | "           " 3 |
| 0 0 1 0 0 | "           " 4 |
| 0 0 1 0 1 | "           " 5 |
| 0 0 1 1 0 | "           " 6 |
| 0 0 1 1 1 | "           " 7 |
| 0 1 0 0 0 | CHANNEL_1_DATA_Ø |
| 0 1 0 0 1 | "           " 1 |
| 0 1 0 1 0 | "           " 2 |
| 0 1 0 1 1 | "           " 3 |
| 0 1 1 0 0 | "           " 4 |
| 0 1 1 0 1 | "           " 5 |
| 0 1 1 1 0 | "           " 6 |
| 0 1 1 1 1 | "           " 7 |
| 1 0 0 0 0 | CHANNEL_2_DATA_Ø |
| 1 0 0 0 1 | "           " 1 |
| 1 0 0 1 0 | "           " 2 |
| 1 0 0 1 1 | "           " 3 |
| 1 0 1 0 0 | "           " 4 |
| 1 0 1 0 1 | "           " 5 |
| 1 0 1 1 0 | "           " 6 |
| 1 0 1 1 1 | "           " 7 |
| 1 1 0 0 0 | "           " 8 |
| 1 1 0 0 1 | "           " 9 |
| 1 1 0 1 0 | "           " 10 |
| 1 1 0 1 1 | "           " 11 |
| 1 1 1 0 0 | "           " 12 |
| 1 1 1 0 1 | "           " 13 |
| 1 1 1 1 0 | "           " 14 |
| 1 1 1 1 1 | "           " 15 |

FIG. 18

INTERFACE SYSTEM HAVING A PROGRAMMABLE NUMBER OF CHANNELS AND METHODS OF IMPLEMENTING SAME

FIELD OF THE INVENTION

The present invention relates to a multiple channel interface between a two systems. More specifically, the present invention relates to a method and structure for providing a multiple channel interface between a computer system and a communication device.

BACKGROUND OF THE INVENTION

FIG. 1 is a block diagram of a conventional computer system 100 which includes a central processing unit (CPU) 1, an arbiter circuit 2, a main memory circuit 3, a PCI bus 4, a first in, first out (FIFO) memory device 5 and a communication controller 6. FIFO memory device 5 includes a PCI interface circuit 5a and a communication interface circuit 5b.

PCI bus 4 operates at a frequency of 33 MHz. Communication controller 6 typically operates at a frequency which is lower than 33 MHz. For example, communication controller 6 can transmit voice data at a frequency of approximately 1.2 kHz or high-speed LAN information at a frequency of approximately 20 MHz. Communication controller 6 typically has multiple data channels which are coupled to PCI bus 4 through FIFO memory device 5.

For data transfer between communication controller 6 and PCI bus 4, communication controller 6 interrupts PCI bus 4 for relatively long periods of time, thereby significantly slowing down the operating speed of PCI bus 4. CPU 1 cannot access PCI bus 4 until after communication controller 6 has completed the data transfer.

Moreover, FIFO memory device 5 has a fixed number of channels and a fixed number of entries per channel. Thus, different FIFO memory devices are necessary for use with different communication devices.

It would therefore be desirable to have a multi-channel data transfer circuit which overcomes the shortcomings of prior art FIFO memory devices.

SUMMARY

Accordingly, the present invention provides a multi-channel data transfer circuit and method which provides an interface between a computer system and a multi-channel communication controller. The data transfer circuit is programmable to provide a selectable number of communication channels between the computer system and the communication controller. The data transfer circuit is further programmable to provide a selectable number of entries in each of the communication channels. In a particular embodiment, FIFO memories within the data transfer circuit are logically partitioned to provide the desired number of communication channels and the desired number of entries per channel. Each of the communication channels can have the same number of entries. Alternatively, different communication channels can have different numbers of entries. As a result, the data transfer circuit can be configured in view of the particular requirements of the computer system and the communication controller.

The data transfer circuit includes a multi-channel transmit circuit for providing data values from the computer system to the communication controller, and a multi-channel receive circuit for providing data values from the computer communication controller to the computer system. Both the transmit and receive circuits include caching systems to promote burst read and write accesses to the computer system. These burst accesses advantageously minimize the amount of time that the communication controller ties up the bus of the computer system.

The present invention will be more fully understood in light of the following detailed description taken together with the drawings.

BRIEF DESCRIPTION OF THE DRAWINGS

FIG. 15 is a schematic diagram of a data memory used in the multi-channel transmit circuit of FIG. 13;

FIG. 18 is a schematic diagram of a data memory used in the multi-channel receive circuit of FIG. 16.

DETAILED DESCRIPTION

Figure 1:
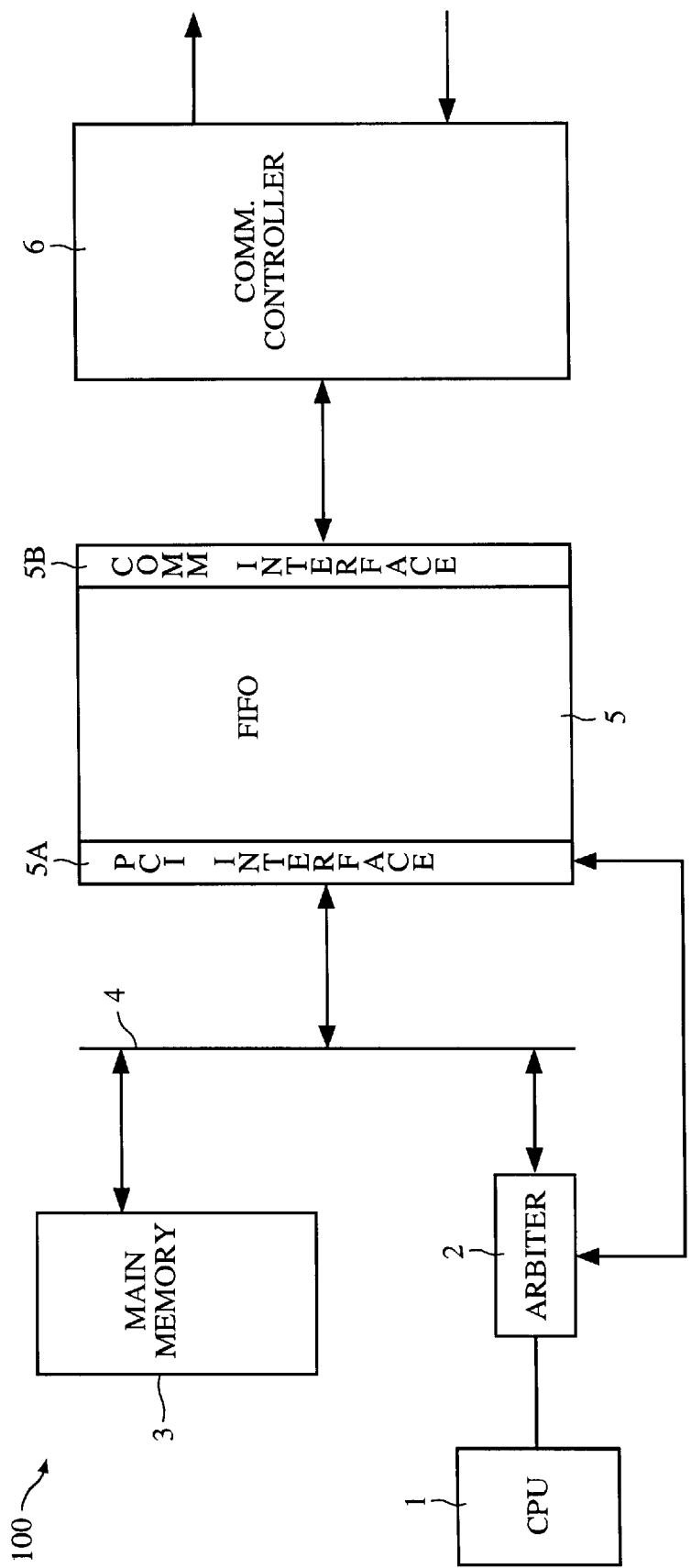
FIG. 1 is a block diagram of a conventional communication system.
Figure 2:
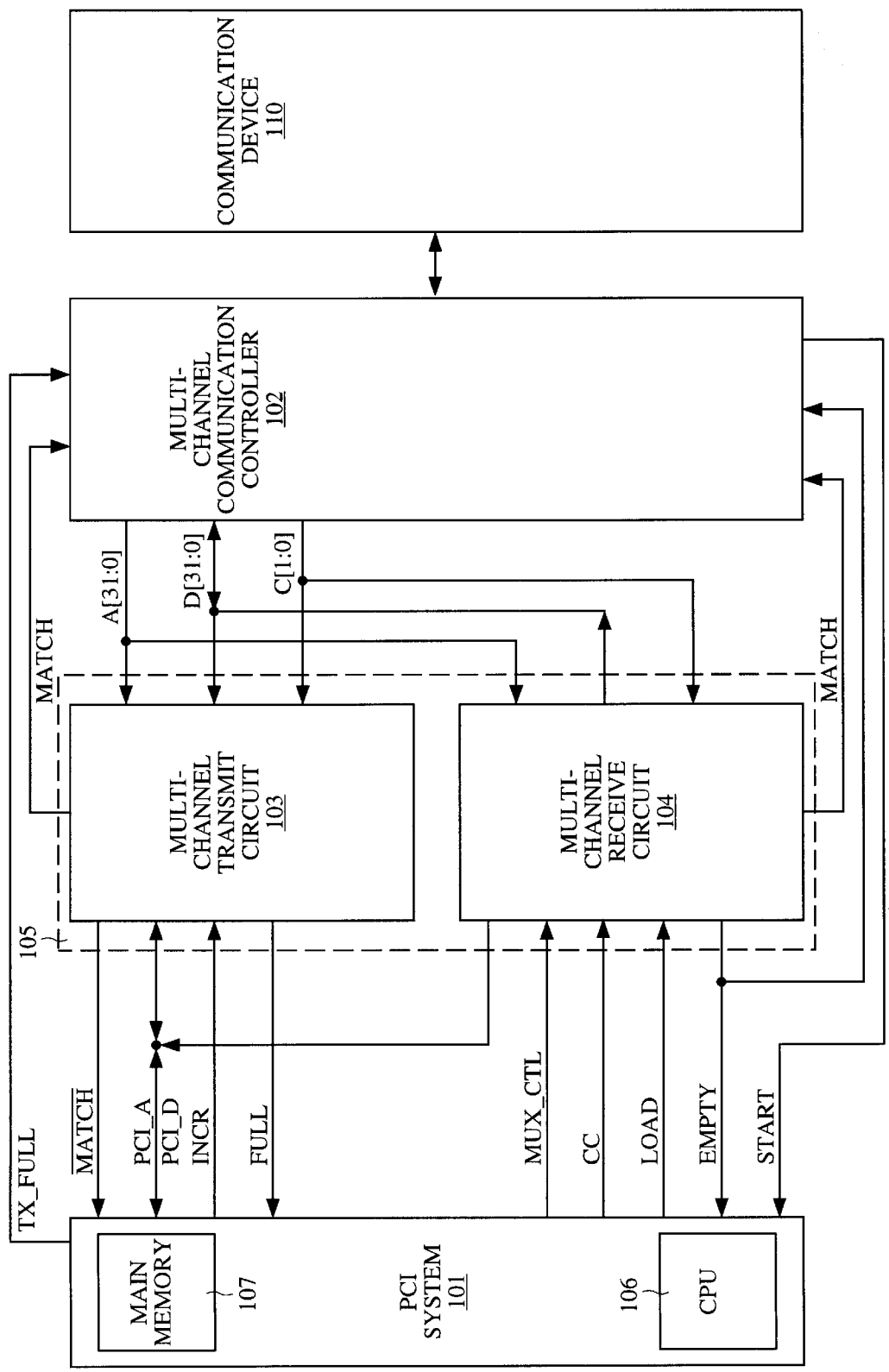
FIG. 2 is a block diagram which illustrates a multi-channel data transfer circuit in accordance with one embodiment of the invention.

FIG. 2 is a block diagram which illustrates a multi-channel data transfer circuit 105 in accordance with one embodiment of the invention. Data transfer circuit 105 includes multi-channel transmit circuit 103 and multi-channel receive circuit 104. Data transfer circuit 105 is connected between PCI system 101 and multi-channel communication controller 102. Multi-channel communication controller 102 is connected to a communication device 110. PCI system 101 includes a central processing unit (CPU) 106 and a main memory 107. A 32-bit wide PCI bus couples PCI system 101 to transmit circuit 103 and receive circuit 104. Address and data information is transmitted on PCI bus in an interleaved manner. The operating frequency of the PCI bus is typically 33 Mhz. The operating frequency of communication device 110 is slower than 33 Mhz, typically in the range of 1.2 khz to 20 Mhz. These frequencies are illustrative but not limiting. For purposes of the present invention it is only important that the operating frequency of the PCI system 101 is greater than the operating frequency of communication device 110.

Data is transmitted from PCI system 101 to multi-channel communication controller 102 through multi-channel transmit circuit 103. Similarly, PCI system 101 receives information from the communication controller 102 through multi-channel receive circuit 104. As described in more detail below, the transmit circuit 103 and the receive circuit 104 can each be selectably partitioned into a plurality of channels to facilitate multi-channel communication between PCI system 101 and communication device 110. In a particular embodiment, the multi-channel data transfer circuit 105 is implemented using a programmable device such as a field programmable gate array (FPGA). In such an embodiment, the number of data transfer channels and the number of data entries per channel can be selected by programming the FPGA in an appropriate manner.

Figure 3:
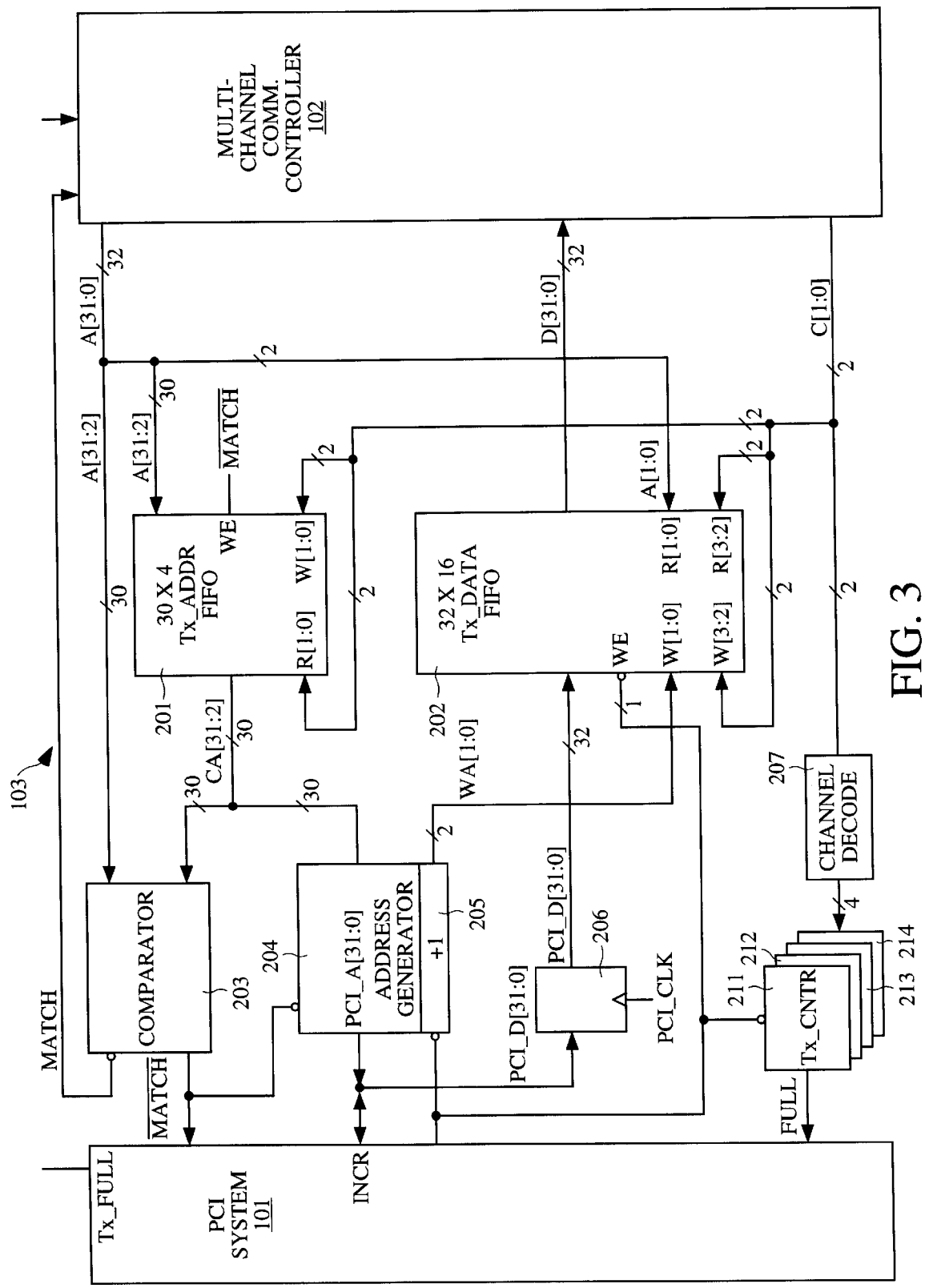
FIG. 3 is a block diagram of a multi-channel transmit circuit in accordance with one embodiment of the present invention.

In the described embodiment, multi-channel communication controller 102 is a Motorola 68360 quad universal interface communication controller (QUICC) which controls up to four communication channels. In other embodiments, other multi-channel communication controllers are used. Multi-channel communication controller 102 generates a 32-bit address signal A[31:0] which is provided to transmit circuit 103 and receive circuit 104. Communication controller 102 further generates a 2-bit channel signal C[1:0] which identifies the selected one of the four communication channels. Channel signal C[1:0] is provided to both transmit circuit 103 and receive circuit 104. Communication controller 102 also includes a bi-directional data bus which routes 32-bit data signals D[31:0] from transmit circuit 103 and to receive circuit 104. The other signals illustrated in FIG. 2 are described in more detail below. FIG. 3 is a block diagram of multi-channel transmit circuit 103. Transmit circuit 103 includes transmit address first in, first out (Tx$_{13}$ ADDR FIFO) memory 201, transmit data (Tx$_{13}$ DATA) FIFO memory 202, comparator 203, address generator circuit 204, incrementer circuit 205, data storage register 206, channel decoder 207 and transmit data counter (Tx$_{13}$ CNTR) circuits 211–214. Multi-channel transmit circuit 103 enables communication controller 102 to retrieve data values from the main memory 107 in PCI system 101. Transmit circuit 103 operates as follows.

The following general discussion relates to the operation of a single channel of multi-channel transmit circuit 103. In general, communication controller 102 generates a 32-bit address signal A[31:0] which is used to address the main memory 107 of PCI system 101. As described in more detail below, the upper 30 bits of this 32-bit address signal A[31:0] are used to retrieve a block of four consecutive data values (or double words) from the main memory of PCI system 101. These four consecutive data values are transferred from PCI system 101 to Tx_DATA FIFO 202 of transmit circuit 103 in a burst data transfer. The burst data transfer is controlled by PCI system 101, and proceeds at the frequency of operation of PCI system 101 (i.e., 33 Mhz). The upper 30 bits of address signal A[31:0] are stored as a cache address in Tx_ADDR FIFO 201.

One of the four data values stored in Tx_DATA FIFO 202 is the data value requested by the original address signal A[31:0]. This particular data value is read from Tx_DATA FIFO 202 and provided to communication controller 102.

To access the next desired data value, communication controller 102 subsequently generates another 32-bit address signal A[31:0] to address the main memory 107 of PCI system 101. The upper 30 bits of this address signal are compared with the previously stored cache address (i.e., the upper 30 bits of the previous address signal). A match indicates that the desired data value was previously stored in Tx_DATA FIFO 202 as one of the four consecutive data values. In this case, the desired data value is read from Tx$_{13}$ DATA FIFO 202, thereby eliminating the need to interrupt PCI system 101. A non-match indicates that the desired data value must be retrieved from the main memory 107 of PCI system 101. In this case, the upper 30 bits of the new 32-bit address signal A[31:0] are used to retrieve a new block of four consecutive data values from the main memory 107 of PCI system 101. These four new consecutive data values are transferred from PCI system 101 to Tx_DATA FIFO 202 in a burst data transfer. The upper 30 bits of the new 32-bit address signal A[31:0] are stored in Tx_ADDR FIFO 201 as the new cache address. Transmit circuit 103 is designed to retrieve data values for all four channels of communication controller 102.

The operation of multi-channel transmit circuit 103 will now be described more specifically. Communication controller 102 generates a 2-bit channel signal C[1:0] which is representative of the channel which will be used to receive data from PCI system 101. Table 1 defines the four channels which are identified by the 2-bit channel signal.

TABLE 1

| C [1:0] | Channel |
|---------|-----------|
| 00 | Channel_0 |
| 01 | Channel_1 |
| 10 | Channel_2 |
| 11 | Channel_3 |

The channel signal C[1:0] is provided to the read and write address ports R[1:0] and W[1:0] of Tx_ADDR FIFO 201 and to the read and write address ports R[3:2] and W[3:2] of Tx_DATA FIFO 302. The channel signal C[1:0] is also provided to channel decoder 207. In response to the channel signal C[1:0], channel decoder 207 enables one of the Tx_CNTR circuits 211–214. Table 2 describes the channel assignments for Tx_CNTR circuits 211–214 in accordance with one embodiment of the invention.

TABLE 2

| C [1:0] | Enabled Tx CNTR circuit |
|---------|-------------------------|
| 0 0 | 211 |
| 0 1 | 212 |

TABLE 2-continued

| C [1:0] | Enabled Tx CNTR circuit |
|---|---|
| 1 0 | 213 |
| 1 1 | 214 |

Each Tx_CNTR circuit 211–214 generates a logic high FULL signal when in a full condition. Initially, each of the Tx_CNTR circuits 211–214 is initialized to an empty state. The enabled transmission counter is incremented each time that PCI system 101 asserts a logic low increment (INCR) signal. In this manner, the four transmission counters (Tx_CNTRs) 211–214 keep track of the number of data values written to each channel of Tx_DATA FIFO 202. Each of Tx_CNTR circuits 211–214 can be reset to an empty state by PCI system 101.

Communication controller 102 also generates a 32-bit address signal A[31:0] which identifies the address to be accessed within main memory 107. Address bits A[31:2] are provided to the data input port of Tx_ADDR FIFO 201 and to a first input port of comparator 206. Address bits A[1:0] are provided to an address input port R[1:0] of Tx_DATA FIFO 202.

Figure 4:
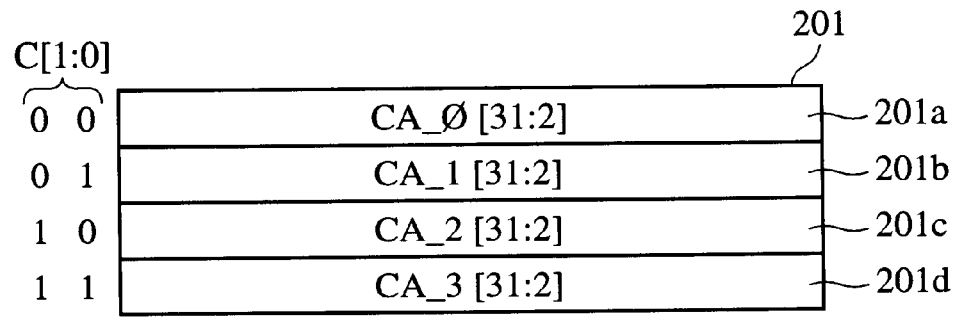
FIG. 4 is a schematic diagram of an address memory used in the multi-channel transmit circuit of FIG. 3 in one embodiment of the invention.

FIG. 4 is a schematic diagram of Tx_ADDR FIFO 201, which includes four 30-bit entries 201a, 201b, 201c and 201d. Each of entries 201a, 201b, 201c, and 201d corresponds to one of the four channels as identified by the channel signal C[1:0] and stores a corresponding 30-bit cache address signal CA_0[31:2], CA_1[31:2], CA_2[31:2], and CA3[31:2]. That is, each of the four channels has a dedicated cache address signal. Initially, each of the four cache address signals CA_0[31:2], CA_1[31:2], CA_2[31:2], and CA_3[31:2] is set to an invalid address (e.g., all zero values).

The cache address for the channel identified by the C[1:0] signal is read out of Tx_ADDR FIFO as the 30-bit cache address signal CA[31:2]. This cache address signal CA[31:2] is provided to a second input port of comparator 203. Comparator 203 compares the cache address signal CA[31:2] with the upper 30-bits of address signal A[31:2]. If the cache address signal CA[31:2] is equal to the initial address signal A[31:2], then comparator 203 generates a logic high MATCH signal and a logic low $\overline{\text{MATCH}}$ signal. Conversely, if the cache address signal CA[31:2] is not equal to the initial address signal A[31:2], then comparator 203 generates a logic low MATCH signal and a logic high $\overline{\text{MATCH}}$ signal. The MATCH signal is provided to communication controller 102, and the $\overline{\text{MATCH}}$ signal is provided to PCI system 101, to the load enable port of address generator circuit 204, and to the write enable port of Tx_ADDR FIFO 201.

Figure 5:
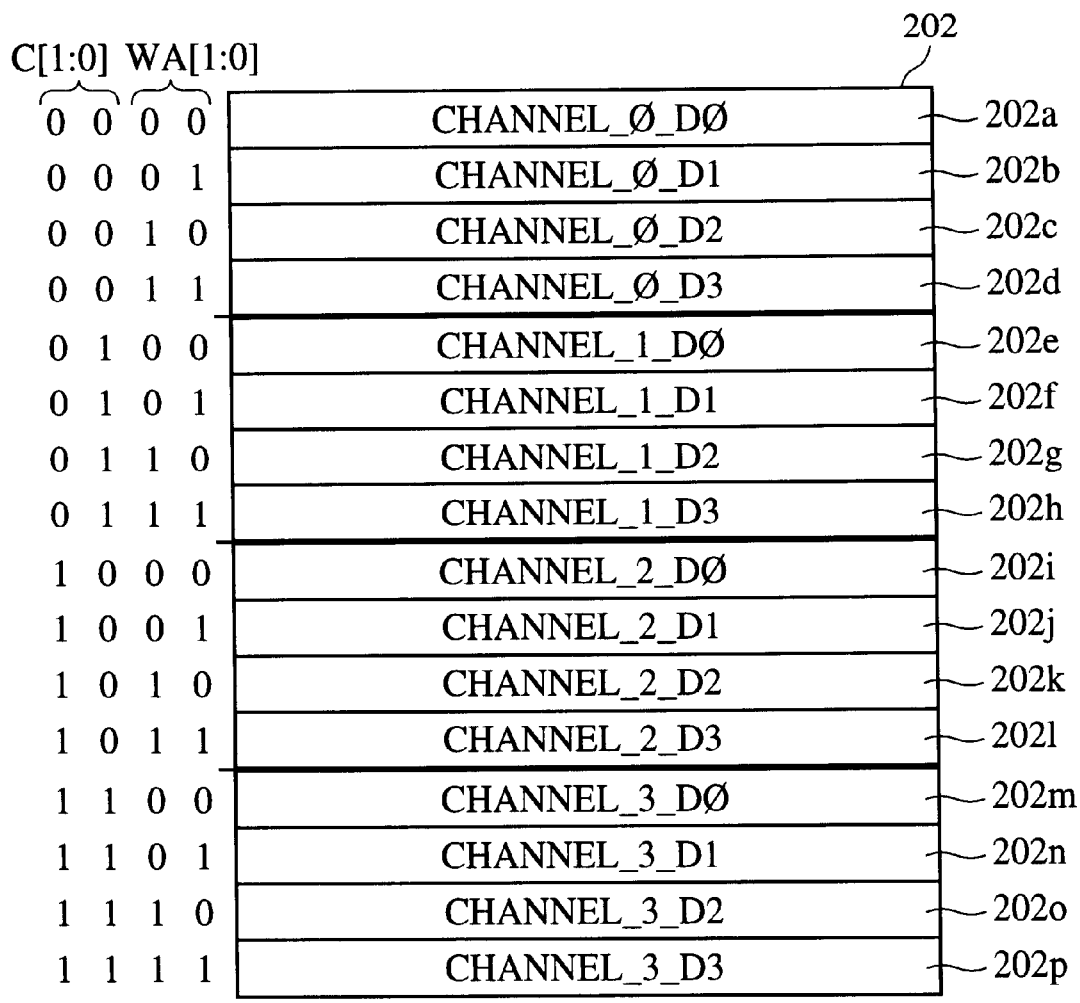
FIG. 5 is a schematic diagram of a data memory used in the multi-channel transmit circuit of FIG. 3 in one embodiment of the invention.

FIG. 5 is a schematic diagram of Tx_DATA FIFO 202 in accordance with one embodiment of the invention. Tx_DATA FIFO 202 includes 16 entries 202a–202p, with each entry having 32 bits. The 16 entries are partitioned into four channels which are accessed in response to the channel signal C[1:0]. Table 3 identifies the channels corresponding to the channel signal C[1:0].

TABLE 3

| C [1:0] | Channel |
|---|---|
| 0 0 | Channel 0 |
| 0 1 | Channel 1 |
| 1 0 | Channel 2 |
| 1 1 | Channel 3 |

Each of the four channels of Tx_DATA FIFO 202 is capable of storing up to four data values. Within each channel, the data values being written to Tx_DATA FIFO 202 are addressed by a 2-bit write address signal WA[1:0] provided by incrementer circuit 205. The write address signal WA[1:0] is initialized at a value of "00". Data values PCI_D[31:0], which are provided by PCI system 101, are written to the addressed location of Tx_DATA FIFO 202 in response to an increment (INCR) signal provided by PCI system 101.

Also within each channel, the data values being read from Tx_DATA FIFO 202 are addressed by address bits A[1:0]. The data value which is read from Tx_DATA FIFO 202 is continuously provided at the data output port of Tx_DATA FIFO 202 as data value D[31:0].

A specific example will be used to further describe the operation of multi-channel transmit circuit 103. In this example, communication controller 102 sequentially accesses four data values D0[31:0], D1[31:0], D2[31:0] and D3[31:0] which are stored in main memory 107 within PCI system 101 via Channel 0 of transmit circuit 103. Thus, in this example, the channel signal C[1:0] has a value of "00". The four data values D0[31:0], D1[31:0], D2[31:0] and D3[31:0] are stored in consecutive addresses A0[31:0], A1[31:0], A2[31:0] and A3[31:0] respectively, within main memory 107. The two least significant bits of addresses A0[31:0], A1[31:0], A2[31:0] and A3[31:0], are "00", "01", "10" and "11", respectively.

Initially, communication controller 102 provides the channel signal C[1:0] to channel decoder 207, which in turn, enables Tx_CNTR circuit 211. As previously discussed, Tx$_{13}$ CNTR circuit 211 is initially reset to a 00 count.

Communication controller 102 also provides first address signal A0[31:0] to transmit circuit 103. Address bits A0[31:2] are provided to the data input port of Tx_ADDR FIFO 201 and to the first input port of comparator 203. Because the cache address signal CA[31:2] is initially set to an invalid value, there is no match between the initial cache address signal CA[31:2] and the initial address signal A0[31:2] (i.e., there is a cache miss). Consequently, comparator 203 asserts a logic high $\overline{\text{MATCH}}$ signal and a logic low MATCH signal.

The logic low MATCH signal is provided to communication controller 102, thereby informing communication controller 102 that PCI system 101 must be accessed to retrieve the first desired data value D0[31:0]. In response to the logic low MATCH signal, communication controller 102 delays the transmission of additional address signals A[31:0] until after a Tx_FULL signal is received from PCI system 101 (i.e., until after data value D0[31:0] is available).

The logic high $\overline{\text{MATCH}}$ signal is applied to the write enable terminal of Tx_ADDR FIFO 201, thereby causing first address signal A0[31:2] to be written to Tx_ADDR FIFO 201. The value of channel signal C[1:0] causes the first address signal A0[31:2] to be written to entry 201a of Tx_ADDR FIFO 201 as cache address signal CA_0[31:2].

The new cache address signal CA_0[31:2] is provided to comparator 203 and address generator circuit 204 as cache address signal CA[31:2]. Because the cache address signal CA[31:2] now matches the address signal A0[31:2], the $\overline{\text{MATCH}}$ signal transitions to a logic low state. The logic low $\overline{\text{MATCH}}$ signal causes the new cache address signal CA[31:2] to be loaded into address generator 204. Address generator 204 concatenates two "0" values at the least significant bit positions of cache address signal CA[31:2], thereby creating a 32-bit PCI address signal PCI_A[31:0].

The $\overline{\text{MATCH}}$ signal is also provided to PCI system 101. PCI system 101 initiates a burst read data transfer in response to the rising edge of the $\overline{\text{MATCH}}$ signal (i.e., when there is no match between the current address signal A[31:2] and the cache address signal CA[31:2]). The initial address of the burst read data transfer is defined by the 32-bit PCI address signal PCI_A[31:0] provided by address generator circuit 204. In the present example, address signal PCI_A[31:0] is the same as the first address signal A0[31:0], although this equality does not exist in all cases.

In response to the PCI address signal PCI_A[31:0], PCI system 101 provides first data value D0[31:0] to data register 206 as data value PCI_D[31:0]. This first data value D0[31:0] is clocked into register 206 by the PCI system clock signal PCI_CLK.

PCI system 101 then asserts a logic low increment (INCR) signal which causes the first data value D0[31:0] to be written to Tx_DATA FIFO 202. The first data value D0[31:0] is written to entry 202a of Tx_DATA FIFO 202 in response to the channel signal C[1:0] provided by communication controller 102 and the write address WA[1:0] provided by incrementer circuit 205.

The logic low INCR signal also causes incrementer circuit 205 and the enabled Tx_CNTR circuit 211 to be incremented by one. Thus, incrementer circuit 205 provides a write address WA[1:0] having a value of "01" after the INCR signal is asserted low.

PCI system 101 then provides the second data value D1[31:0] to data register 206 as PCI_D[31:0]. The second data value D1[31:0] is selected from an address within main memory 107 which is consecutive with the initial address signal PCI_A[31:0]. The second data value D1[31:0] is clocked into register 206 by the PCI_CLK signal. PCI system 101 then asserts the INCR signal low, thereby causing the second data value D1[31:0] to be written to Tx_DATA FIFO 202. Because incrementer circuit 205 was previously incremented by one, the second data value D1[31:0] is stored at entry 202b within Tx_DATA FIFO 202.

In the foregoing manner, PCI system 101 bursts consecutive data values into Tx_DATA FIFO 202 until the enabled Tx_CNTR circuit 211 indicates a full condition by generating a logic high FULL signal. In the described embodiment, Tx_CNTR circuit 211 becomes full after the INCR signal has been asserted four times. In response to the logic high FULL signal, PCI system 101 stops the burst read transaction. At this time, data values D0[31:0], D1[31:0], D2[31:0] and D3[31:0] have been retrieved from PCI system 101 and stored at respective entries 202a, 202b, 202c and 202d of Tx_DATA FIFO 202.

Upon receiving the FULL signal from the enabled Tx_CNTR circuit 211, PCI system 101 generates a transmission counter full (Tx_13 FULL) signal, which is provided to multi-channel communication controller 102. Upon receiving the Tx_FULL signal, communication controller 102 receives the originally requested data value A0[31:0] from Tx_DATA FIFO 202 as follows. One of the four data values burst into Tx_DATA FIFO 202 corresponds to the address signal A0[31:0] originally transmitted by communication controller 102. This desired data value (i.e., D0[31:0]) is addressed in Tx_DATA FIFO 202 by the two least significant bits A0[1:0] of address signal A0[31:0] and the channel signal C[1:0]. More specifically, the channel signal C[1:0] provides the two most significant read address bits R[3:2] and the address signal A[1:0] provides the two least significant read address bits R[1:0].

Communication controller 102 may subsequently attempt to read a second data value from the main memory 107 in PCI system 101. To accomplish this, communication controller 102 generates second address signal A[31:0] and another channel signal C[1:0]. In the described example, this second address signal is A1[31:0] and the second channel signal still has a value of "00". The upper 30 bits A1[31:2] of this second address signal A1[31:0] are provided to comparator 203. The channel signal C[1:0] is provided to the read address port R[1:0] of Tx_ADDR FIFO 201, thereby causing Tx_ADDR FIFO 201 to provide the cache address signal CA[31:2] corresponding to channel signal C[1:0] to comparator 203.

If the second address signal A1[31:2] is equal to the cache address signal CA[31:2], then the data value being requested has already been retrieved from PCI system 101 during a previous burst data transfer, and is stored in Tx_DATA FIFO 202 (i.e., a cache hit has occurred). Under these conditions, comparator 203 generates a logic low $\overline{\text{MATCH}}$ signal, which is provided to PCI system 101. As a result of the logic low $\overline{\text{MATCH}}$ signal, the 30 most significant bits A[31:2] of the second address signal A[31:0] are not written to Tx_ADDR FIFO 201, PCI system 101 is not accessed, and the cache address signal CA[31:2] is not loaded into address generator 204. Comparator 203 further generates a logic high MATCH signal which is provided to multi-channel communication controller 102. In response to the logic high MATCH signal, the requested data value is read out of Tx_DATA FIFO 202 in response to the C[1:0] and A1[1:0] signals. Because PCI system 101 is not accessed at this time, PCI system 101 can continue to operate at full speed without being interrupted by communication controller 102.

The serial nature of the communication data values requested by communication controller 102 results in a relatively high cache hit rate within multi-channel transmit circuit 103. Each of the four channels within transmit circuit 103 experiences this high cache hit rate. The high cache hit rate greatly reduces the rate at which communication controller 102 must interrupt PCI system 101. The performance of PCI system 101 is thereby enhanced.

Figure 6:
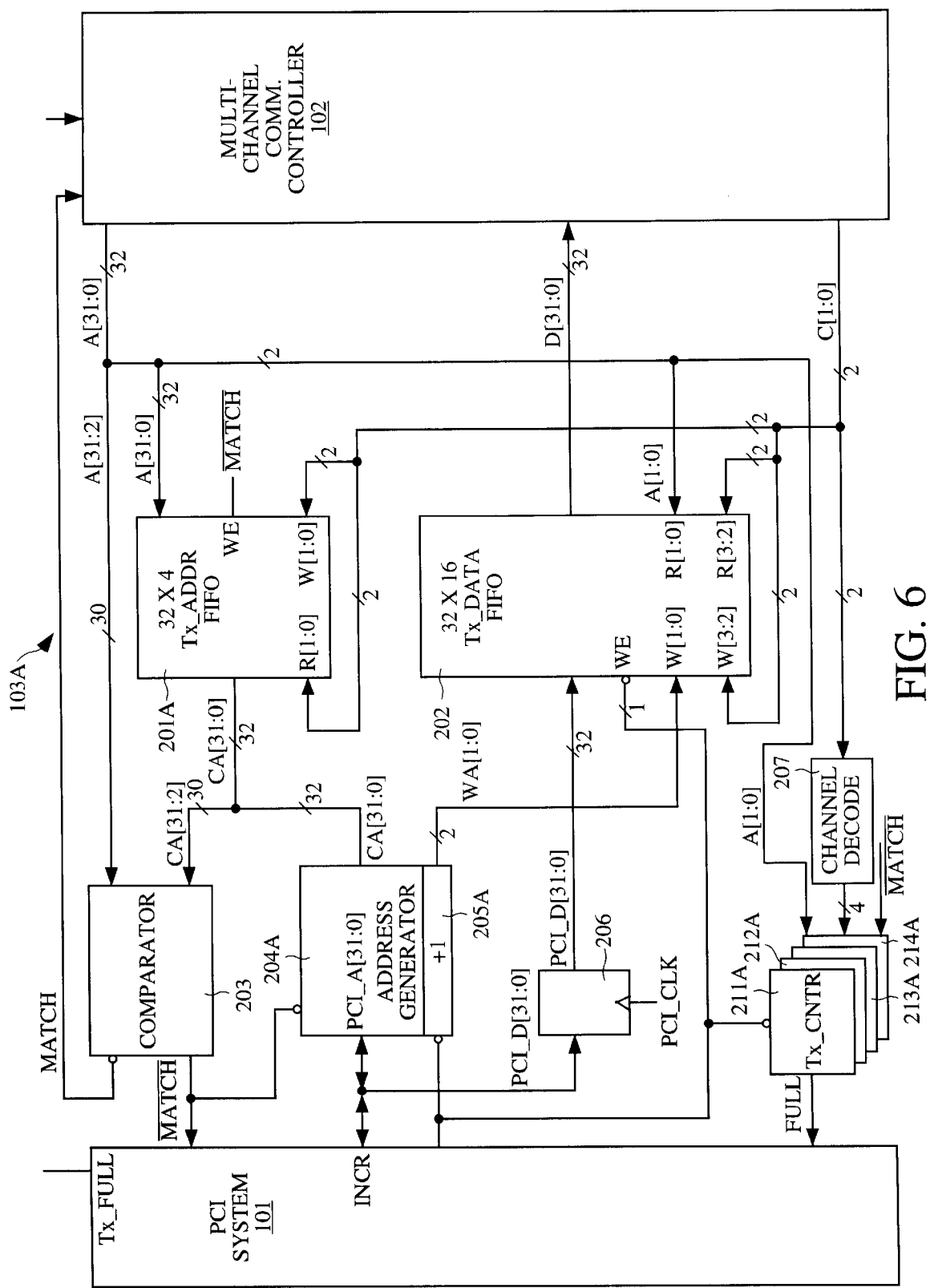
FIG. 6 is a block diagram of a multi-channel transmit circuit in accordance with an alternative embodiment of the present invention.

FIG. 6 is a block diagram of a multi-channel transmit circuit 103A in accordance with another embodiment of the invention. Transmit circuit 103A, which is similar to transmit circuit 103 (FIG. 3), includes many of the same elements as transmit circuit 103. Thus, transmit circuit 103A includes Tx_DATA FIFO memory 202, comparator 203, data storage register 206 and channel decoder 207, as previously discussed. Tx_ADDR FIFO memory 201A, address generator circuit 204A, incrementer circuit 205A, and Tx_CNTR circuits 211A–214A are similar to the previously described Tx_ADDR FIFO memory 201, address generator circuit 204, incrementer circuit 205, and Tx_CNTR circuits 211–214, respectively, with the differences between these circuits described below.

First, Tx_ADDR FIFO 201A is a 32×4 FIFO, and not a 30×4 FIFO. Thus, Tx_13 ADDR FIFO 201A receives a 32-bit address signal A[31:0], and provides a 32-bit cache address output signal CA[31:0]. The upper 30 bits of the cache address signal CA[31:2], and the upper 30 bits of the address signal A[31:2] are provided to comparator 203, thereby enabling comparator 203 to operate in the manner previously described.

The entire 32-bit cache address signal CA[31:0] is provided to address generator 204A. When the MATCH signal is asserted high to indicate that no match exists, the CA[31:0] signal is loaded into address generator 204A as PCI address signal PCI_A[31:0]. The PCI system 101 initiates the burst access starting from the address indicated by the PCI address signal PCI_A[31:0]. The incrementer circuit 205A is loaded with the two least significant bits of the cache address signal CA[31:0] loaded into address generator 204A (i.e., CA[1:0]).

Tx_CNTR circuits 211A–214A are coupled to receive the two least significant bits of the address signal A[31:0] (i.e., A[1:0]) from communication controller 102. These address bits A[1:0] are loaded into the selected Tx_CNTR circuit when the MATCH signal is in a logic high state. Consequently, at the beginning of a burst access, the Tx_CNTR circuit of the selected channel is initialized to be equal to the A[1:0] address bits.

Figure 7:
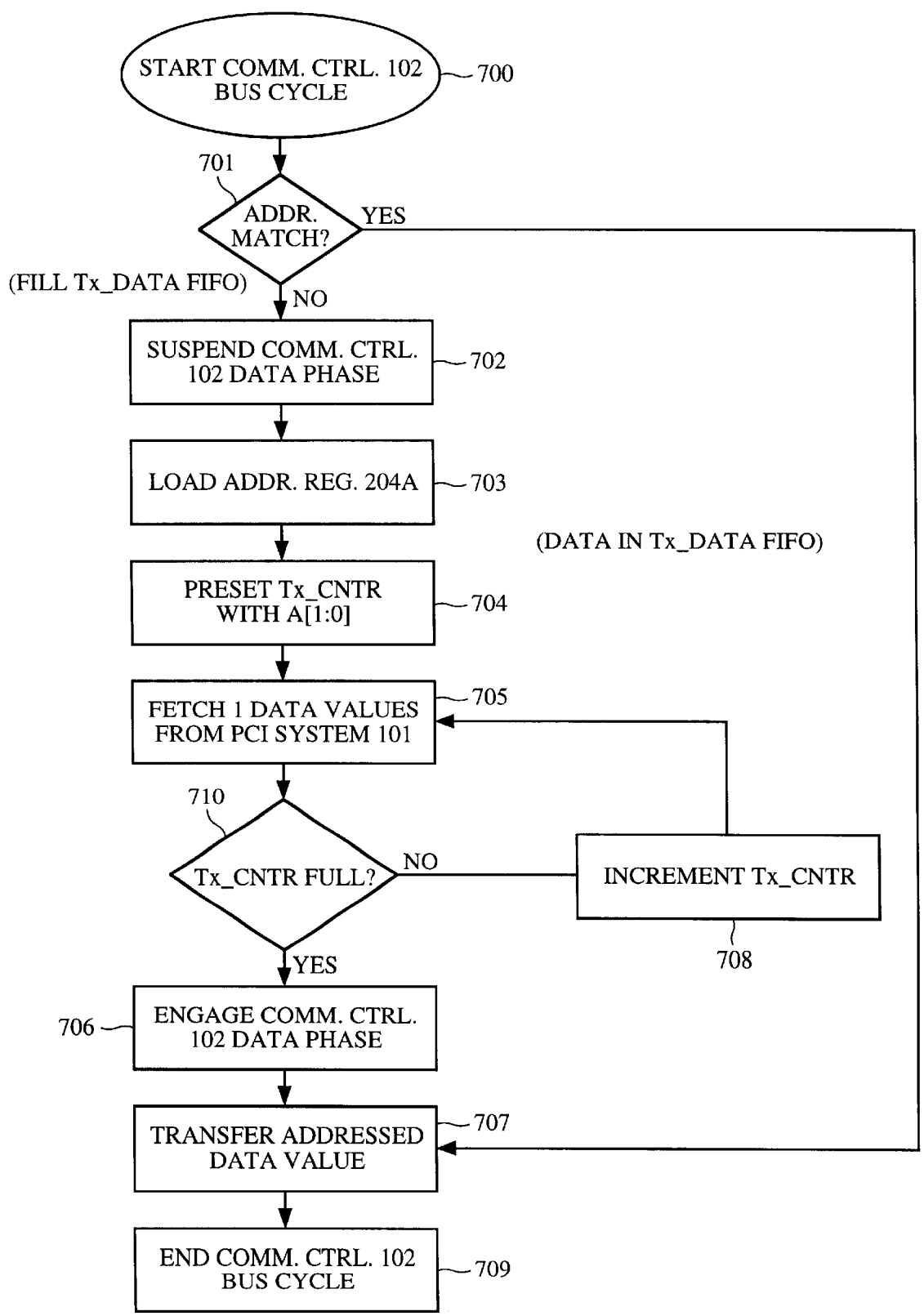
FIG. 7 is a flow diagram which defines the operation of the multi-channel transmit circuit of FIG. 6 in accordance with one embodiment of the invention.

The operation of transmit circuit 103A will now be described in connection with an example. In this example, communication controller 102 accesses four data values D1[31:0], D2[31:0], D3[31:0] and D4[31:0] which are stored in main memory 107 within PCI system 101 via Channel 0 of transmit circuit 103. Thus, in this example, the channel signal C[1:0] has a value of "00". The four data values D1[31:0], D2[31:0], D3[31:0] and D4[31:0] are stored in consecutive addresses A1[31:0], A2[31:0], A3[31:0] and A4[31:0] respectively, within main memory 107. The two least significant bits of addresses A1[31:0], A2[31:0], A3[31:0] and A4[31:0], are "01", "10", "11" and "00", respectively. The 30 most significant bits of addresses A1[31:0], A2[31:0] and A3[31:0] are equal to one another. However, the 30 most significant bits of address A4[31:0] are greater (by one) than the 30 most significant bits of addresses A1[31:0], A2[31:0] and A3[31:0]. FIG. 7 is a flow diagram which sets forth various process steps performed in accordance with the described example.

Initially, communication controller 102 provides the channel signal C[1:0] to channel decoder 207, which in turn, enables Tx_CNTR circuit 211A. Communication controller 102 additionally provides first address signal A1[31:0] to the data input port of Tx_ADDR FIFO 201A, and provides address bits A1[31:2] to the first input port of comparator 203. Comparator 203 then determines if address bits A1[31:2] match cache address bits CA[31:2]. (Step 701). Because the cache address signal CA[31:0] is initially set to an invalid value, comparator 203 does not detect a match. Consequently, comparator 203 asserts a logic high MATCH signal and a logic low MATCH signal. The data phase of the communication controller is suspended in response to the logic low MATCH signal (Step 702).

The logic high MATCH signal is applied to the write enable terminal of Tx_ADDR FIFO 201A, thereby causing first address signal A1[31:0] to be written to Tx_ADDR FIFO 201A as cache address signal CA_0[31:0]. The new cache address signal CA_0[31:0] is provided to address generator circuit 204A as cache address signal CA[31:0]. The logic high MATCH signal causes the cache address signal CA[31:0] to be loaded into address generator circuit 204A as PCI address signal PCI_A[31:0]. (Step 703). The two least significant bits of the cache address signal CA[31:0] written to address generator 204A ("01" in the present example) are loaded into the incrementer circuit 205A.

The MATCH signal is also provided to Tx_CNTR circuits 211A–214A. The logic high MATCH signal causes the address bits A0[1:0] ("01" in the present example) to be loaded into the enabled Tx_CNTR circuit 211A. (Step 704). Tx_CNTR circuit 211A subsequently counts upward from this loaded value in response to the INCR signal received from PCI system 101. Tx_CNTR circuit 211A generates a FULL signal when the Tx_CNTR circuit reaches a "11" count.

PCI system 101 sequentially bursts data values D1–D3 to Tx_DATA FIFO 202 through latch 206 as previously described in connection with transmit circuit 103. Initially, the first data value D1 is written to location 202b of the Tx_DATA FIFO 202 because of the "01" value of the WA[1:0] signal (Step 705). The Tx_CNTR circuit 211A is then incremented (Step 708) and the second data value D2 is written to location 202c of the Tx_DATA FIFO 202 (Step 705), because of the "10" value of the WA[1:0] signal. The Tx_CNTR circuit 211A is again incremented (Step 708) and the third data value D3 is written to location 202d of the Tx_DATA FIFO 202 (Step 705), because of the "11" value of the WA[1:0] signal.

After the third data value D3 is written to Tx_DATA FIFO 202, the Tx_CNTR circuit 211A becomes full and asserts the FULL signal to PCI system 101. In response, PCI system 101 stops providing data values to the Tx_DATA FIFO 202 and asserts the Tx_FULL signal, which informs the communication controller 102 that the data values D1–D3 are available. At this time, communication controller 102 is enabled to read the addressed data value D1 from Tx_DATA FIFO 202 in response to the channel signal C[1:0] and address signals A[1:0]. (Steps 710, 706, 707). The first bus cycle of the communication controller 102 is then completed (Step 709). Processing then returns to initial Step 700.

For a sequential burst operation, communication controller 102 generates the second address signal A2[31:0]. Comparator 203 detects a match between address bits A2[31:2] and cache address bits CA[31:2]. (Step 701). Processing then proceeds to Steps 706, 707 and 709, where the second data value D2 is read directly from Tx_DATA FIFO 202.

Communication controller 102 then generates the third address signal A3[31:0]. Comparator 203 detects a match between address bits A3[31:2] and cache address bits CA[31:2]. (Step 701). Processing then proceeds to Steps 706, 707 and 709, where the third data value D3 is read directly from Tx_DATA FIFO 202.

If the communication controller 102 generates the fourth address signal A4[31:0] to access the fourth data value D4, then comparator 203 detects that no match exists between address bits A4[31:2] and cache address bits CA[31:2], because the upper 30 bits of address A4 are not equal to the upper 30 bits of addresses A1–A3 (Step 701). As a result, the previously described steps (Steps 700–709) are implemented in the manner previously described to retrieve four new consecutive data values, starting with the fourth data value D4. Note that because the two least significant address bits A4[1:0] each have a "0" value, four data values are retrieved before the Tx_CNTR circuit 211A becomes full.

Figure 8:
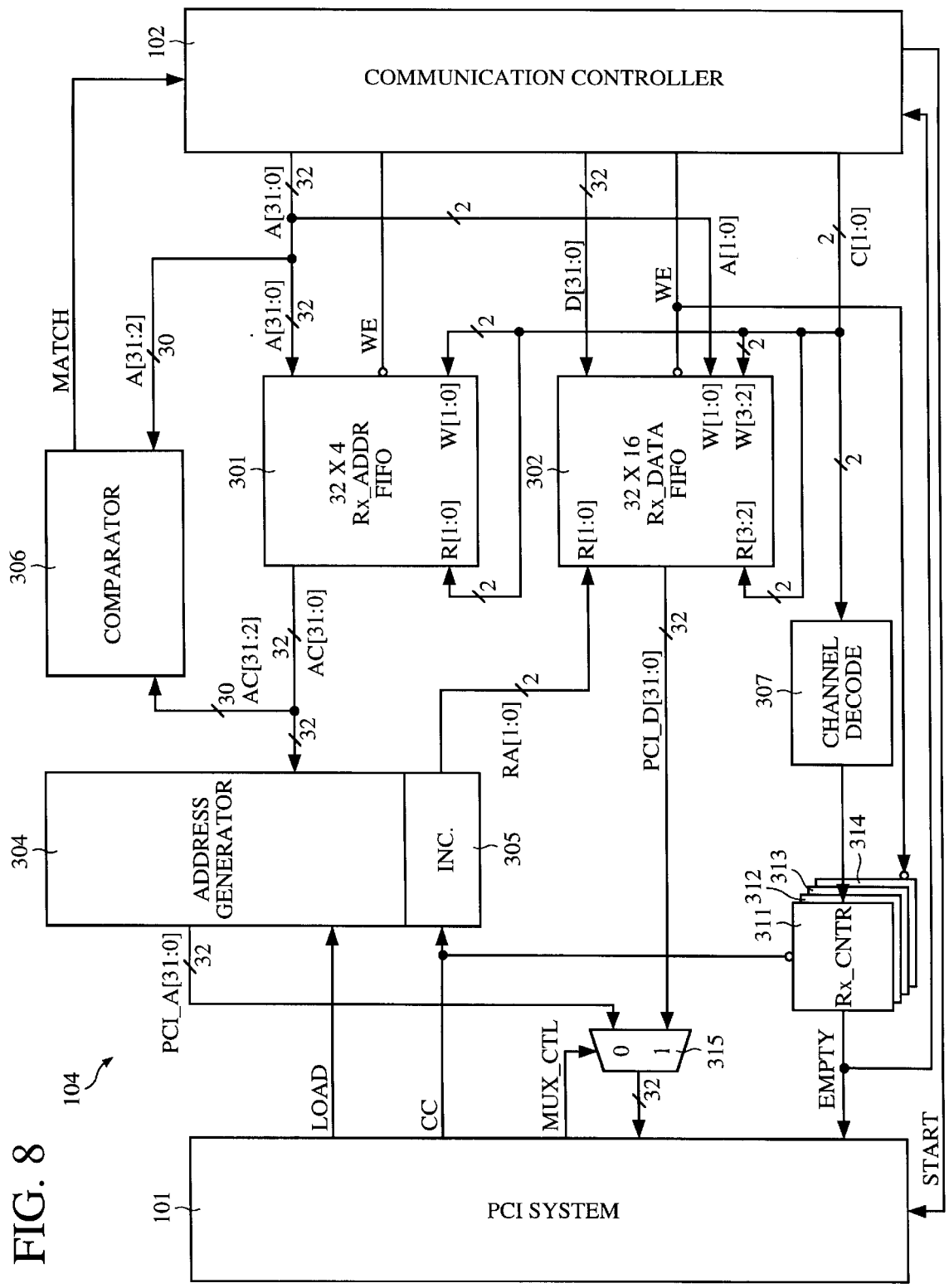
FIG. 8 is a block diagram of a multi-channel receive circuit in accordance with one embodiment of the present invention.

FIG. 8 is a block diagram of multi-channel receive circuit 104 in accordance with one embodiment of the present invention. Multi-channel receive circuit 104 includes receive address FIFO (Rx_ADDR FIFO) memory 301, receive data FIFO (Rx_DATA FIFO) memory 302, address generator circuit 304, incrementer circuit 305, comparator 306, channel decoder 307, receive data counters (Rx_CNTRs) 311–314 and address/data multiplexer 315. Receive circuit 104 enables the main memory 107 in PCI system 101 to receive data values through multiple channels from communication controller 102 at a high data rate. Receive circuit 104 operates as follows.

Communication controller 102 generates a 2-bit channel signal C[1:0] which is representative of the channel to be used to transmit data from communication controller 102 to PCI system 101. The channel signal C[1:0] is provided to the read and write address ports R[1:0] and W[1:0] of Rx_ADDR FIFO 301 and to the read and write address ports R[3:2] and W[3:2] of Rx_DATA FIFO 302. The channel signal C[1:0] is also provided to channel decoder 307. In response to the channel signal C[1:0], channel decoder 307 enables one of the Rx_CNTR circuits 311–314. Table 4 describes the channel assignments for Rx_CNTR circuits 311–314 in accordance with one embodiment of the invention.

TABLE 4

| C [1:0] | Enabled Rx CNTR circuit |
| --- | --- |
| 0 0 | 311 |
| 0 1 | 312 |
| 1 0 | 313 |
| 1 1 | 314 |

Each Rx_CNTR circuit 311–314 generates a logic high EMPTY signal when empty. Initially, each of the Rx_CNTR circuits 311–314 is initialized to an empty ("000") state.

Communication controller 102 also generates a 32-bit address signal A[31:0] and a 32-bit data signal D[31:0]. The address signal A[31:0] identifies the address within main memory 107 to which the data signal D[31:0] will be written. Address signal A[31:0] is provided to the data input port of Rx_ADDR FIFO 301. The upper 30 address bits A[31:2] of address signal A[31:0] are provided to a first input port of comparator 306. Address bits A[1:0] are provided to an address input port of Rx_DATA FIFO 302 as write address bits W[1:0]. Data signal D[31:0] is provided to the data input port of Rx_DATA FIFO 302.

Figure 9:
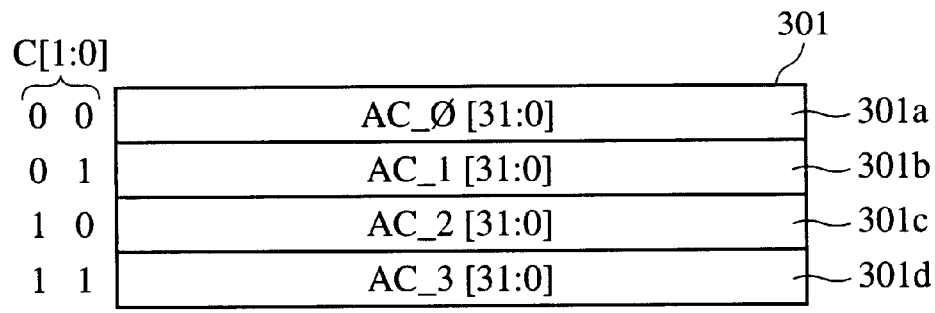
FIG. 9 is a schematic diagram of an address memory used in the multi-channel receive circuit of FIG. 8 in one embodiment of the invention.

FIG. 9 is a schematic diagram of Rx_ADDR FIFO 301, which includes four 32-bit entries 301a, 301b, 301c and 301d. Each of entries 301a, 301b, 301c, and 301d has a corresponding channel address 00, 01, 10 and 11, and stores a corresponding 32-bit cache address signal AC_0[31:0], AC_1[31:0], AC_2[31:0], and AC_3[31:0]. Initially, each of the four cache address signals AC_0[31:0], AC_1[31:0], AC_2[31:0], and AC_3[31:0] is set to an invalid address (e.g., all zero values).

The cache address for the channel identified by the C[1:0] signal is read out of Rx_ADDR FIFO 301 as the 32-bit cache address signal AC[31:0]. The upper 30 bits of this cache address signal AC[31:2] are provided to a second input port of comparator 306. Comparator 306 compares the upper 30 bits of cache address signal AC[31:2] to the upper 30-bits of the initial address signal A[31:2]. If the cache address signal AC[31:2] is equal to the initial address signal A[31:2], comparator 306 generates a logic high MATCH signal. Conversely, if cache address signal AC[31:2] is not equal to the initial address signal A[31:2], comparator 306 generates a logic low MATCH signal. The MATCH signal is provided to communication controller 102.

Figure 10:
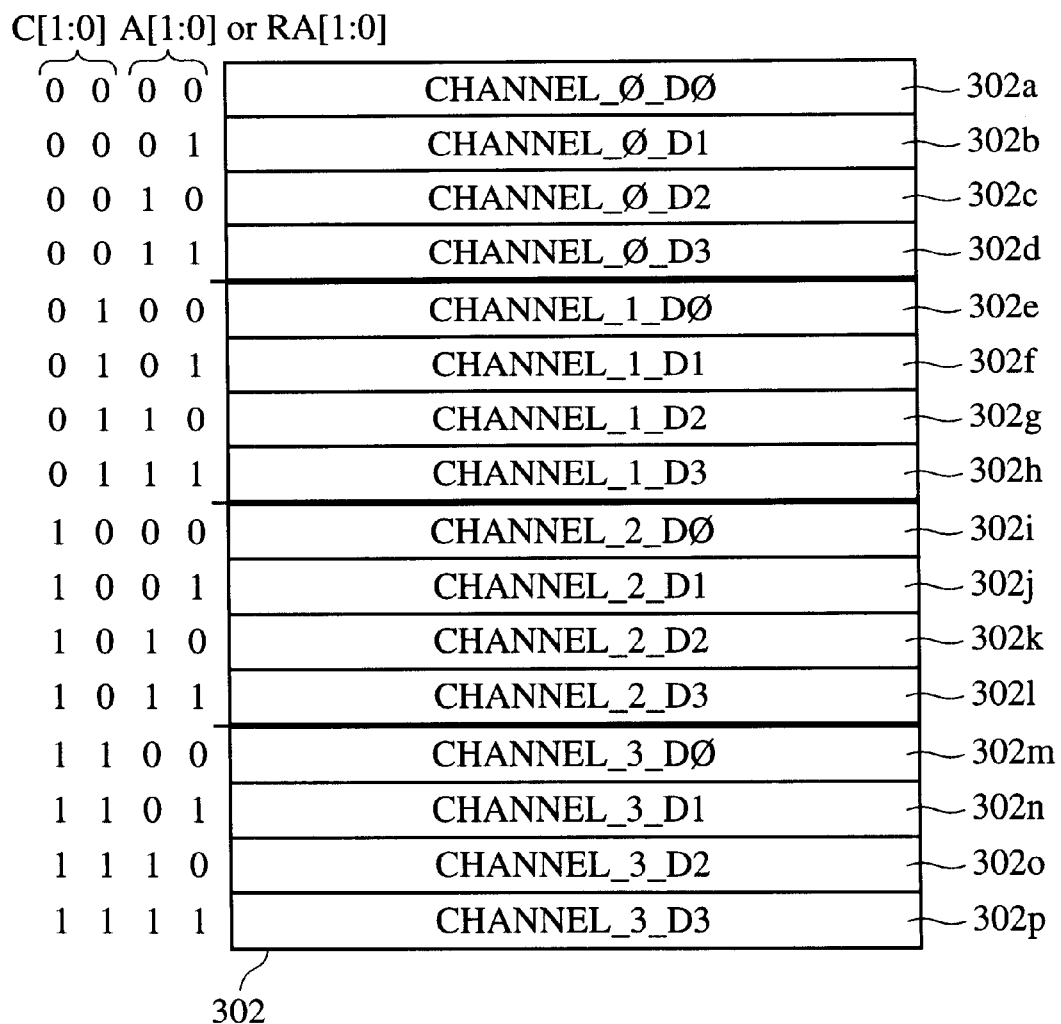
FIG. 10 is a schematic diagram of a data memory used in the multi-channel receive circuit of FIG. 8 in one embodiment of the invention.

FIG. 10 is a schematic diagram of Rx_DATA FIFO 302 in accordance with one embodiment of the invention. Rx_DATA FIFO 302 includes 16 entries 302a–302p, with each entry having 32 bits. The 16 entries are partitioned into four channels which are accessed in response to the channel signal C[1:0]. Table 5 identifies the channels corresponding to the channel signal C[1:0].

TABLE 5

| C [1:0] | Channel |
| --- | --- |
| 0 0 | Channel 0 |
| 0 1 | Channel 1 |
| 1 0 | Channel 2 |
| 1 1 | Channel 3 |

Each of the four channels of Rx_DATA FIFO 302 is capable of storing up to four data values. The four data values which can be written to each channel are addressed by address bits A[1:0] (provided at write address port W[1:0]). Data value D[31:0] is written to the addressed entry within Rx_DATA FIFO 302 when the write enable (WE) signal is asserted low by communication controller 102.

Figure 11:
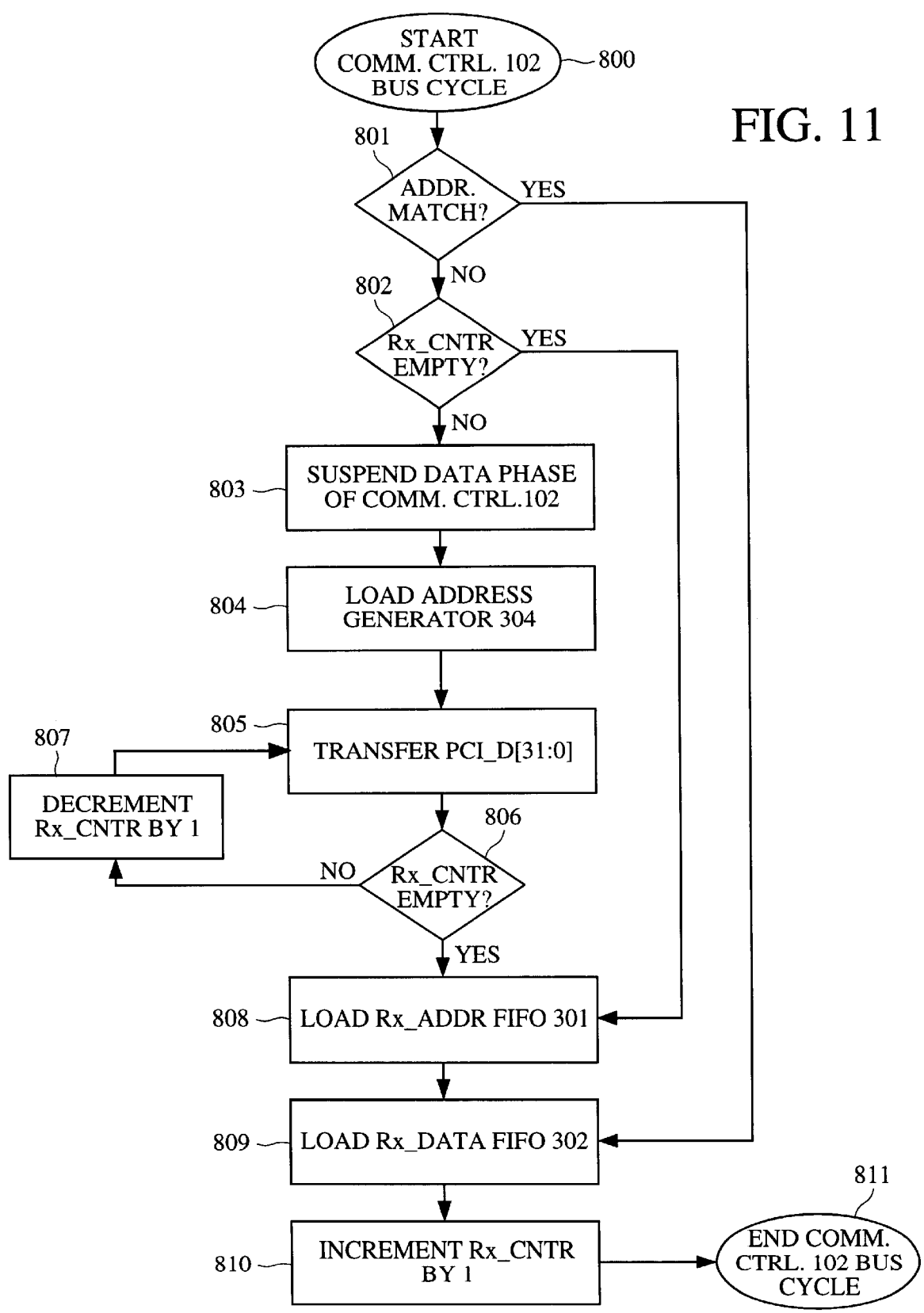
FIG. 11 is a flow diagram which defines the operation of the multi-channel receive circuit of FIG. 8 in accordance with one embodiment of the invention.

A specific example will be used to further describe the operation of receive circuit 104. In this example, four data values D0[31:0], D1[31:0], D2[31:0] and D3[31:0] will be transferred from communication device 102 to PCI system 101 via Channel 0 of receive circuit 104. Thus, the channel signal C[1:0] has a value of "00". The four data values D0[31:0], D1[31:0], D2[31:0] and D3[31:0] are to be written to consecutive addresses A0[31:0], A1[31:0], A2[31:0] and A3[31:0] respectively, within main memory 107. The two least significant bits of addresses A0[31:0], A1[31:0], A2[31:0] and A3[31:0], are "00", "01", "10" and "11", respectively. FIG. 11 is a flow diagram illustrating various steps performed during the operation of receiving circuit 104 in accordance with one embodiment of the invention.

Initially, communication controller 102 provides the channel signal C[1:0] to channel decoder 307, which in turn, enables Rx_CNTR circuit 311. Rx_CNTR circuit 311 is initially empty and therefore provides a logic high EMPTY signal to communication controller 102 and PCI system 101. The channel signal C[1:0] is also provided to Rx_ADDR FIFO 301 and Rx_DATA FIFO 302 as previously described.

The upper 30 bits of address A0[31:0] (i.e., A0[31:2]) are provided to comparator 306. Because the cache address of the accessed channel of the Rx_ADDR FIFO 301 (as identified by channel signal C[1:0]) is initially invalid, no match is detected. Consequently, comparator 306 generates a logic low MATCH signal. In response to the logic low MATCH signal and the logic high EMPTY signal, communication controller 102 asserts a write enable signal which writes the address A0[31:0] into Rx_ADDR FIFO 301. (Steps 801, 802, 808). Address bits A0[31:0] are written to entry 301a of Rx_ADDR FIFO 301 in response to the channel signal C[1:0].

Also in response to the logic low MATCH signal and the logic high EMPTY signal, communication controller 102 asserts a write enable signal which causes the first data value D0[31:0] to be written to Rx_DATA FIFO 302. (Step 809). First data value D0[31:0] is written to entry 302a of Rx_DATA FIFO 302 in response to the channel signal C[1:0] and the address bits A0[1:0].

The write enable signal applied to Rx_DATA FIFO 302 is also applied to Rx_CNTR circuit 311. When the write enable signal is asserted, Rx_CNTR circuit 311 is incremented by one (to "001"). (Step 810). Thus, after data value D0[31:0] is written to Rx_DATA FIFO 302, Rx_CNTR circuit 311 no longer provides a logic high EMPTY signal.

During the next cycle, communication controller 102 provides address signal A1[31:0] to Rx_ADDR FIFO 301 and provides data signal D1[31:0] to Rx_DATA FIFO 302. Comparator 306 compares cache address signal AC[31:2] (i.e., previously stored A0[31:2]) with address signal A1[31:2] and determines that a match exists. (Step 801). In response, comparator 306 asserts a logic high MATCH signal which is provided to communication controller 102. In response, communication controller 102 asserts a write enable signal which is provided to Rx_DATA FIFO 302, thereby causing data value D1[31:0] to be written to Rx_DATA FIFO 302 and causing Rx_CNTR circuit to be incremented by one (to "010"). (Steps 809, 810). Data value D1[31:0] is written to entry 302b in response to channel signal C[1:0] and address bits A1[1:0].

The previously described cycle continues, with data value D2[31:0] being written to entry 302c of Rx_DATA FIFO 302 in response to address signal A2[31:0], and data value D3[31:0] being written to entry 302d of Rx_DATA FIFO 302 in response to address signal A3[31:0]. After data value D3 has been written to Rx_DATA FIFO 302, Rx_CNTR circuit 311 has a count of "100".

Subsequently, a fifth data value D4[31:0], having a corresponding address A4[31:0], is provided to channel 0 by communication controller 102. The upper 30 bits of address A4[31:0] are provided to comparator 306, and a match is not detected. (Step 801). Consequently, comparator 306 generates a logic low MATCH signal. In response to the logic low MATCH signal and the logic low EMPTY signal, communication controller 102 temporarily suspends the assertion of the write enable signals to Rx_ADDR FIFO 301 and Rx_DATA FIFO 302. (Step 803). In addition, communication controller 102 asserts a logic high START signal, which is provided to PCI system 101. In response, PCI system 101 initiates a burst access from receive circuit 104 as follows.

First, PCI system 101 asserts a logic high LOAD signal which causes the cache address signal AC[31:0] (i.e., A0[31:0]) to be loaded into address generator 304. (Step 804). PCI system 101 asserts a logic low MUX_CTL signal to multiplexer 315, thereby causing multiplexer 315 to pass the cache address signal AC[31:0] from address generator 304 to PCI system 101. PCI system 101 uses the cache address signal AC[31:0] as the initial address of the burst access. PCI system 101 then applies a logic high MUX_CTL signal to multiplexer 315, thereby causing multiplexer 315 to route the initial data value PCI_D[31:0] (i.e., D0[31:0]) from Rx_DATA FIFO 302 to PCI system 101. This initial data value PCI_D[31:0] is routed from Rx_DATA FIFO 302 in response to the two least significant bits of the cache address signal AC[1:0] and the channel signal C[1:0].

PCI system 101 then asserts a counter control (CC) signal, which is provided to incrementer circuit 305 and the enabled Rx_CNTR circuit 311. In response, incrementer circuit 305 increments by one the lower two address bits of the cache address signal AC[31:0]. Again, these lower two address bits AC[1:0] are provided to Rx_DATA FIFO 302. In response, the data value corresponding to the next consecutive address (i.e., data value D1[31:0]) is read out of Rx_DATA FIFO 302 and provided to PCI system 101 through multiplexer 315.

The CC signal, when asserted, also causes the enabled Rx_CNTR 311 to be decremented. (Step 807). The previously described sequence continues, with data values being read from Rx_DATA FIFO to PCI system 101, until the enabled Rx_CNTR 311 asserts a logic high EMPTY signal. In the described example, this will occur after the data value D3[31:0] is read from Rx_DATA FIFO 302. In response to the logic high EMPTY signal, PCI system 101 stops the burst access (i.e., stops asserting the CC signal). (Step 806). The PCI system 101 asserts the CC signal at the same frequency as the PCI system clock signal (e.g., 33 MHz). As a result, the data values D0–D3 are provided to PCI system 101 in a manner which does not significantly burden the PCI system bus.

The communication controller 102 also receives the logic high EMPTY signal. In response, communication controller 102 asserts write enable signals to write the new data and address values (i.e., D4[31:0] and A4[31:0]) to Rx_DATA FIFO 301 and Rx_ADDR FIFO 302, respectively. (Steps 802, 808, 809). The process then proceeds as previously described.

The previous example describes a burst access having a length equal to the full channel depth (i.e., four data values). However, the method previously described enables receive circuit 104 to also engage in burst accesses having any length less than the full channel depth (i.e., less than four data values). Moreover, the previous example describes the 2 least significant bits of the initial address A0[31:0] as having an initial value of "00". However, the method previously described enables receive circuit 104 to engage in burst accesses in which the 2 least significant bits of the initial address are any value.

In a particular embodiment, multi-channel data transfer circuit 105 is implemented using a field programmable gate array (FPGA), such as the XC4013E available from Xilinx. The XC4013E FPGA includes 576 configurable logic blocks (CLBs). Each CLB includes two look up tables (LUT) which can be configured into a 1×16 bit dual-port random access memory (RAM)

Figure 12:
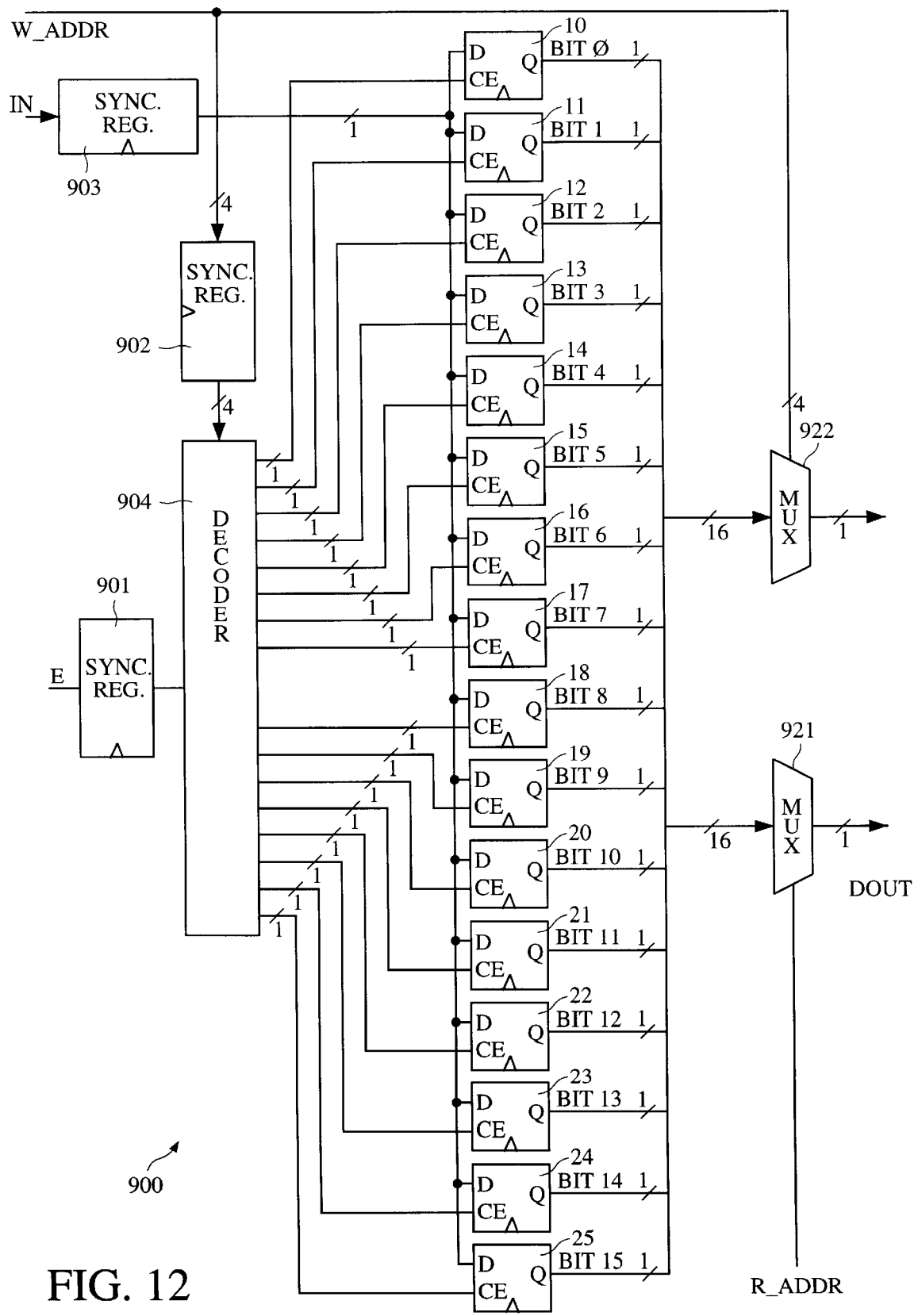
FIG. 12 is a block diagram illustrating a 1×16 bit dual-port random access memory (RAM) which can be used to implement various memories of the multi-channel data transfer circuit in accordance with an embodiment of the present invention.

FIG. 12 is a block diagram illustrating a 1×16 bit dual-port random access memory (RAM) 900 which can be implemented using a CLB of the XC4013E. Dual-port RAM 900 includes synchronization registers 901–903, 4-to-16 decoder 904, D-Q flip flops 10–25 and 16-to-1 multiplexers 921 and 922. Synchronization registers 901–903 and flip-flops 10–25 are all clocked by the same clock signal (not shown).

A 4-bit write address (W_ADDR) signal is provided to 4-to-16 decoder 904 through synchronization register 902. A write enable (WE) signal is provided to decoder 904 through synchronization register 901. When the WE signal is asserted, decoder 904 asserts a clock enable (CE) signal on one of its sixteen output lines, as determined by the W_ADDR signal. The asserted CE signal enables one of flip-flops 10–25.

A data input (DIN) signal is provided to each of the D input terminals of flip-flops 10–25 through synchronization register 903. The enabled flip-flop latches in the DIN signal. The DIN signal is thereby provided at the Q output terminal of the enabled flip-flop. Flip-flops 10–25 provide output data bits BIT0-BIT15, respectively.

The output terminal of each of flip-flops 10–25 is connected to the input terminals of multiplexers 921 and 922. Multiplexer 921 receives a 4-bit read address (R_ADDR) signal at its control terminal. In response to the R_ADDR signal, multiplexer 921 passes a selected one of data bits BIT0-BIT15 as the output value DOUT. Multiplexer 922 passes the data bit which is being written to the dual-port RAM 900 (i.e., the DIN signal) in response to the W_ADDR signal. In the forgoing manner, the XC4013E FPGA provides simultaneous read and write access.

Any CLB within the XC4013E can be configured to operate as a 1×16 bit dual-port RAM as illustrated in FIG. 12. The FIFO memories of multi-channel data transfer circuit 105 of the previously described embodiment can be implemented by combining these 1×16 bit dual-port RAMs. For example, the Tx_DATA FIFO 202 (FIG. 3) can be implemented by combining 32 of these 1×16 bit dual-port RAMs, and the Tx_ADDR FIFO 201 (FIG. 3) can be implemented by combining 30 of these 1×16 bit dual-port RAMs. The XC4013E FPGA is therefore allows custom size FIFO memories to be implemented. These custom FIFO memories can have various widths and depths as required by the particular communication application. For example, custom FIFO blocks can be made having dimensions of 8×16 bits, 16×16 bits, 24×16 bits, 32×16 bits, or 32×32 bits. In such custom FIFO blocks, the length of the data values and the depth of the FIFO block are varied by varying the number of 1×16 bit dual-port RAMs. Thus, multi-channel data transfer circuit 105 can be modified to receive and/or transmit data in 8, 16 or 32-bit formats. Additionally, the depth of the channels in multi-channel data transfer circuit 105 can be modified to enable circuit 105 to operate as a rate converter, depending on the frequencies of PCI system 101 and multi-channel communication controller 102.

In the embodiments described in connection with FIGS. 2–11, multi-channel data transfer circuit 105 is capable of handling four communication channels with four data entries per channel. In other embodiments, multi-channel data transfer circuit 105 is modified to have different number of communication channels and/or different numbers of data entries per channel. This modification can be implemented by re-programming the XC4013E FPGA to provide the appropriate dual-port FIFO blocks. Such re-programming can be performed either before or after the multi-channel data transfer circuit 105 is put into operation. That is, such re-programming can be performed "on-the-fly" while the multi-channel data transfer circuit 105 is operational.

Figure 13:
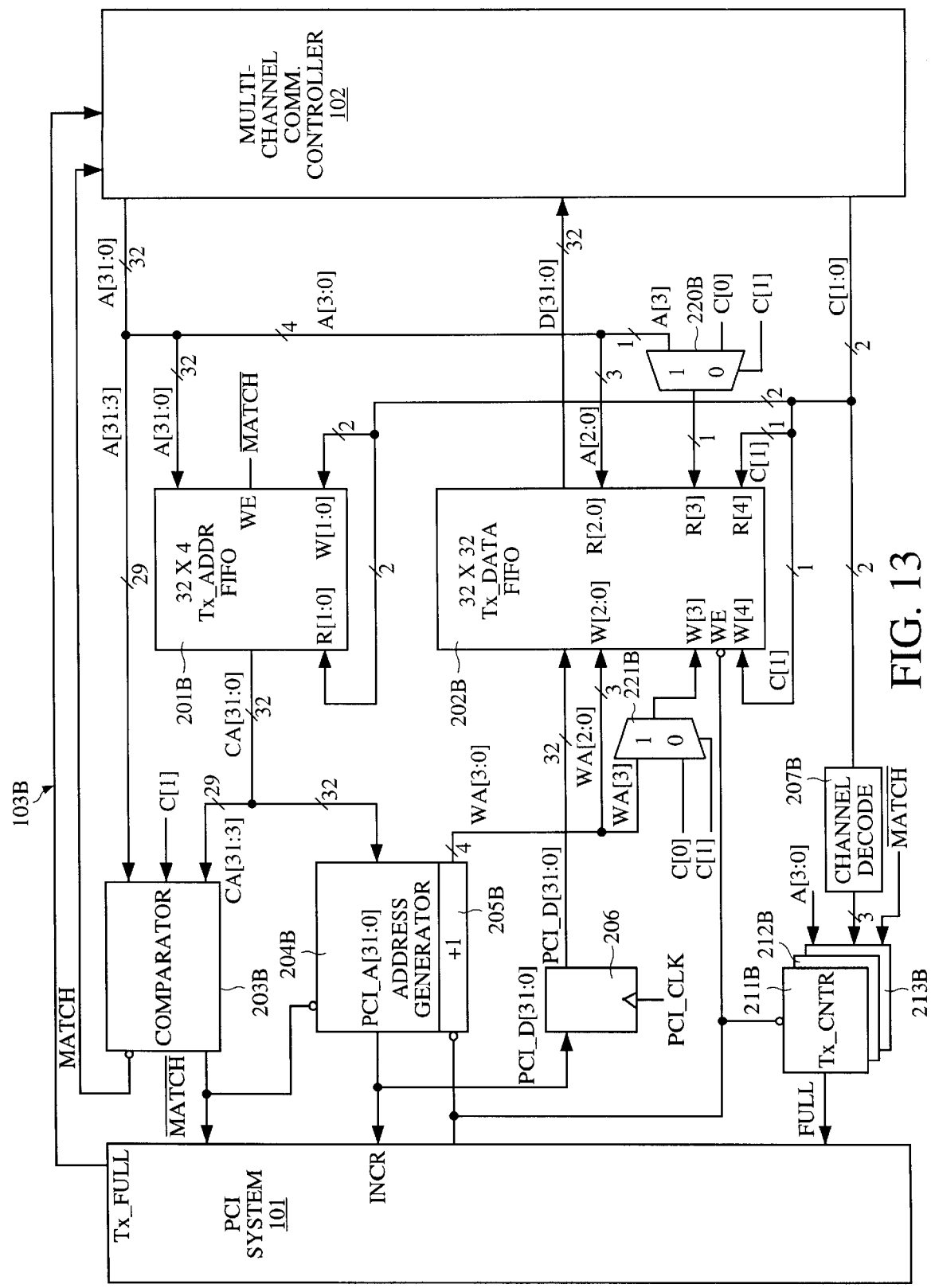
FIG. 13 is a block diagram of a multi-channel transmit circuit in accordance with another embodiment of the invention.

FIG. 13 is a block diagram of a multi-channel transmit circuit 103B in accordance with another embodiment of the invention. In this embodiment, multi-channel transmit circuit 103B uses three data channels to transfer data between PCI system 101 and communication controller 102. Two of the data channels (Channel 0 and Channel 1) have eight data entries per channel and the third data channel (Channel 2) has sixteen data entries per channel. Table 6 defines the three channels which are identified by the 2-bit channel signal C[1:0]. The "X" symbol indicates a "don't care" state.

TABLE 6

| C [1:0] | Channel |
|---|---|
| 00 | Channel_0 |
| 01 | Channel_1 |
| 1X | Channel_2 |

Transmit circuit 103B, which is similar to transmit circuit 103A (FIG. 6), includes many elements which are similar to the elements of transmit circuit 103A. Thus, transmit circuit 103B includes 32×4 bit Tx_ADDR FIFO memory 201B, 32×32 bit Tx_DATA FIFO 202B, comparator 203B, address generator circuit 204B, incrementer circuit 205B, data latch 206B and Tx_CNTR circuits 211B–213B. Transmit circuit 103B further includes multiplexers 220B and 221B. Transmit circuit 103B operates in substantially the same manner as transmit circuit 103A (FIGS. 6, 7). However, transmit circuit 103B is addressed in a slightly different manner because of the different channel configuration. This addressing is described below.

Figure 14:
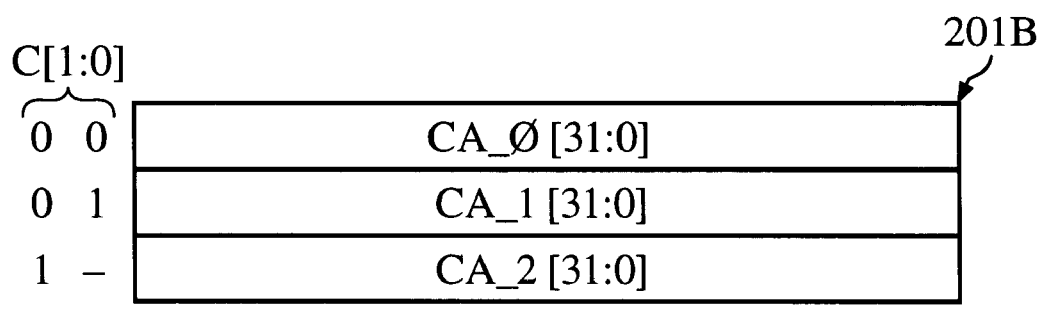
FIG. 14 is a schematic diagram of an address memory used in the multi-channel transmit circuit of FIG. 13.

Tx_ADDR FIFO 201B receives a 32-bit address signal A[31:0], and provides a 32-bit cache address output signal CA[31:0]. Communication controller 102 provides the channel signal C[1:0] to Tx_ADDR FIFO 201B as illustrated. In response, Tx_ADDR FIFO 201B stores address bits A[31:0] as one of cache address signals CA_0[31:0], CA_1[31:0] or CA_2[31:0]. FIG. 14 is a schematic diagram illustrating the addressing of Tx_ADDR FIFO 201B.

The upper 29 bits of the cache address signal CA[31:3], and the upper 29 bits of the address signal A[31:3] are provided to comparator 203B. Comparator 203B also receives channel signal bit C[1]. If the channel signal bit C[1] has a logic 0 value, indicating the selection of either channel 0 or channel 1, then comparator 203B compares CA[31:3] with A[31:3] (a 29-bit comparison) to determine if a cache hit exists. If the channel signal bit C[1] has a logic 1 value, indicating the selection of channel 2, then comparator 203 compares CA[31:4] with A[31:4] (a 28-bit comparison) to determine if a cache hit exists. These different comparisons are necessitated because channel 2 has a depth of sixteen data values, while channels 0 and 1 each have a depth of eight data values.

When comparator 203B detects a cache miss, comparator 203B asserts a logic high $\overline{\text{MATCH}}$ signal, thereby causing the entire 32-bit cache address signal CA[31:0] to be loaded into address generator 204B as PCI address signal PCI_A[31:0]. The PCI system 101 initiates the burst access starting from the address indicated by the PCI address signal PCI_A[31:0]. The incrementer circuit 205B is loaded with the four least significant bits of this PCI address signal PCI_A[31:0] (i.e., CA[3:0]). Consequently, incrementer circuit 205B is capable of providing a 4-bit write address signal WA[3:0] to address Tx_DATA FIFO 202B.

Tx_DATA FIFO 202B is addressed in response to the write address signal WA[3:0] provided by incrementer circuit 205B and the channel signal C[1:0]. FIG. 15 is a schematic diagram of Tx_DATA FIFO 202B in accordance with the present embodiment. As illustrated, Tx_13 DATA FIFO 202B is a 32×32 bit memory which is addressed at the read and write ports by read and write access signals R[4:0] and W[4:0], respectively. The first eight entries of Tx_DATA FIFO 202B are dedicated for storing data values of channel 0, the second eight entries are dedicated for storing data values of channel 1, and the last sixteen entries are dedicated for storing data values of channel 2.

The write access signals W[4:0] are determined as follows. The write access signals W[2:0] correspond to the write address bits WA[2:0] provided by incrementer circuit 205B. The write address bit WA[3] is routed through multiplexer 221B as the write access signal W[3] when the channel bit C[1] has a logic 1 value (i.e., when channel 2 is being accessed). The channel signal bit C[0] is routed through multiplexer 221B as the write access signal W[3] when the channel bit C[1] has a logic 0 value (i.e., when channels 0 and 1 are being accessed). The channel signal bit C[1] is provided as the write access signal W[4]. Such an addressing scheme enables data values to be written to the appropriate locations within Tx_DATA FIFO 202B.

The read access signals R[4:0] for accessing Tx_13 DATA FIFO 202B are determined as follows. The read access signals R[2:0] correspond to address bits A[2:0]. Address bit A[3] is routed through multiplexer 220B as the read access signal R[3] when the channel bit C[1] has a logic 1 value (i.e., when channel 2 is being accessed). The channel signal bit C[0] is routed through multiplexer 220B as the read access signal R[3] when the channel signal bit C[1] has a logic 0 value (i.e., when channels 0 and 1 are being accessed). Read access signal R[4] is set equal to the channel signal bit C[1]. Such an addressing scheme enables data values to be read from the appropriate channel and entry locations within Tx_DATA FIFO 202B.

Tx_CNTR circuits 211B, 212B and 213B operate as follows. In response to the channel signal C[1:0], channel decoder 207B enables (selects) one of the three Tx_CNTR circuits 211B, 212B or 213B. Tx_CNTR circuits 211B and 212B, which correspond to channel 0 and channel 1, respectively, each count up to eight before asserting a logic high FULL signal. Tx_CNTR circuit 213B, which corresponds to channel 2, counts up to sixteen before asserting a logic high FULL signal.

Tx_CNTR circuits 211B–213B are coupled to receive the four least significant bits of the address signal A[31:0] (i.e., A[3:0]) from communication controller 102, and the $\overline{\text{MATCH}}$ signal from comparator 203B. When channel 0 or channel 1 is selected, three address bits A[2:0] are loaded into the selected Tx_CNTR circuit 211B or 212B when the $\overline{\text{MATCH}}$ signal is in a logic high state. When channel 2 is selected, four address bits A[3:0] are loaded into Tx_CNTR circuit 213B when the $\overline{\text{MATCH}}$ signal is in a logic high state. Three address bits are loaded into Tx_CNTR circuits 211B and 212B because the corresponding channels 0 and 1 each have 8 associated data value entries. Four address bits are loaded into Tx_CNTR circuit 213B because the corresponding channel 2 has 16 associated data value entries. The Tx_CNTR circuits 211B–213B begin counting from the values corresponding to these loaded address bits.

The selected Tx_CNTR circuit asserts a FULL signal upon reaching a full count. Upon receiving the FULL signal, the PCI system 101 stops providing data values to Tx_DATA FIFO 202B. Transmit circuit 103B operates in a manner similar to that previously described in connection with transmit circuit 103A (FIGS. 6, 7) to retrieve data values from the PCI system 101, and provide these data values to the communication controller 102 through the Tx_DATA FIFO 202B.

Figure 16:
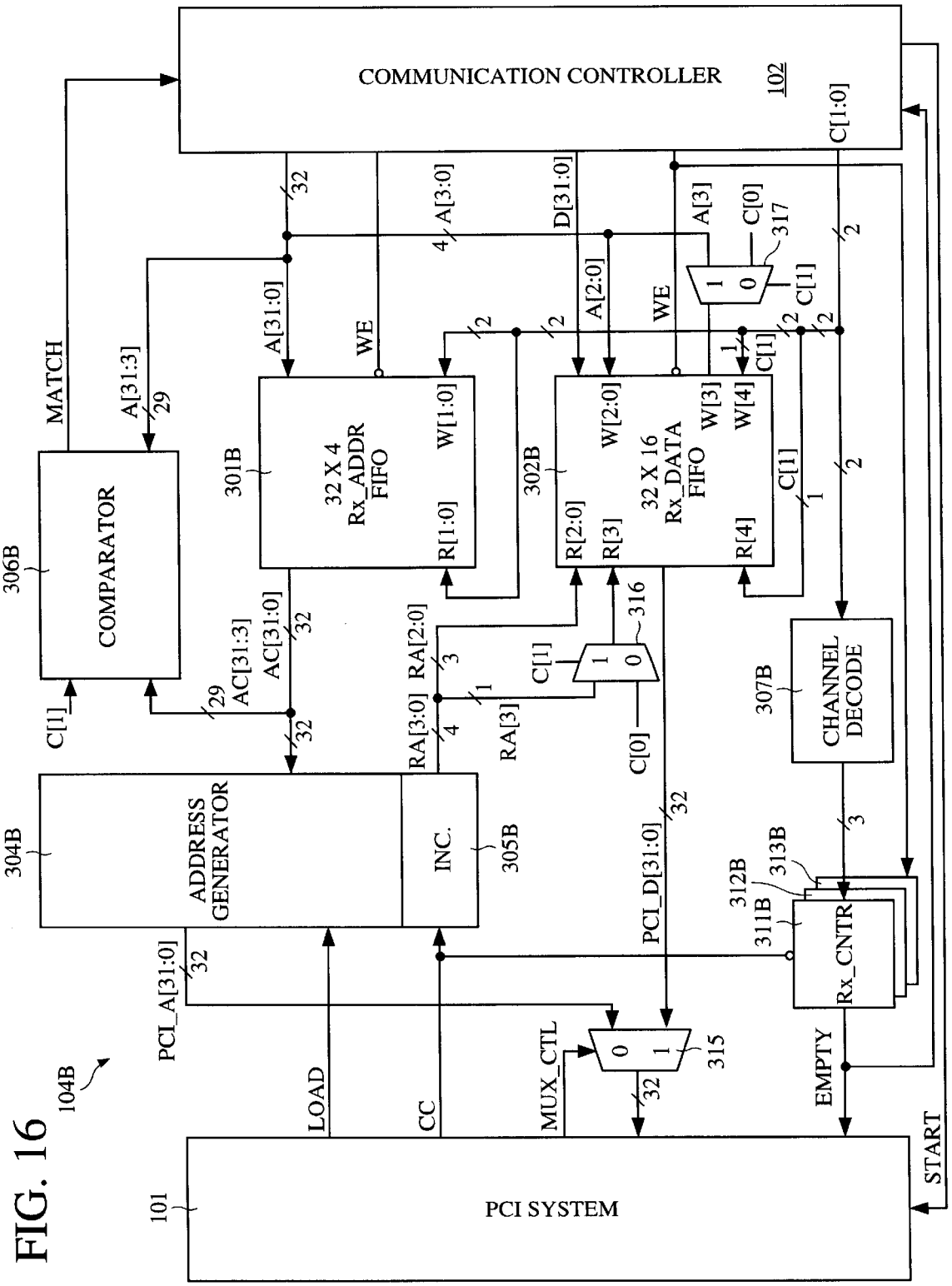
FIG. 16 is a block diagram of a multi-channel receive circuit in accordance with another embodiment of the present invention.

FIG. 16 is a block diagram of a multi-channel receive circuit 104B which can be used with multi-channel transmit circuit 103B. Like transmit circuit 103B, receive circuit 104B uses three data channels to transfer data between PCI system 101 and communication controller 102. Channels 0 and 1 of receive circuit 103B have eight data entries per channel, and channel 2 has sixteen data entries per channel. Table 7 defines the three channels which are identified by the 2-bit channel signal C[1:0].

TABLE 7

| C [1:0] | Channel |
|---|---|
| 00 | Channel_0 |
| 01 | Channel_1 |
| 1X | Channel_2 |

Receive circuit 104B, which is similar to receive circuit 104 (FIG. 8), includes many elements which are similar to the elements of receive circuit 104. Thus, receive circuit 104B includes 32×4 bit Rx_ADDR FIFO memory 301B, 32×32 bit Rx_DATA FIFO 302B, address generator circuit 304B, incrementer circuit 305B, comparator 306B, channel decoder 307B, Rx_CNTR circuits 311B–313B, and multi-plexers 315–317. Receive circuit 104B operates in substantially the same manner as receive circuit 104 (FIGS. 8, 11). However, receive circuit 104B is addressed in a slightly different manner because of the different channel configuration. This addressing is described below.

In response to the channel signal C[1:0], channel decoder 307B enables a corresponding one of the three Rx_CNTR circuits 311B–313B. Table 8 describes the channel assignments for Rx_CNTR circuits 311B–313B.

TABLE 8

| C [1:0] | Enabled Rx CNTR circuit |
|---|---|
| 0 0 | 311B |
| 0 1 | 312B |
| 1 X | 313B |

Rx_CNTR circuits 311B and 312B, which correspond to channel 0 and channel 1, respectively, each count to eight. Rx_CNTR circuit 313, which corresponds to channel 2, counts to sixteen. Otherwise, Rx_CNTR circuits 311B–313B operate in the same manner as the previously described Rx_CNTR circuits 311–314 (FIGS. 8, 11).

Figure 17:
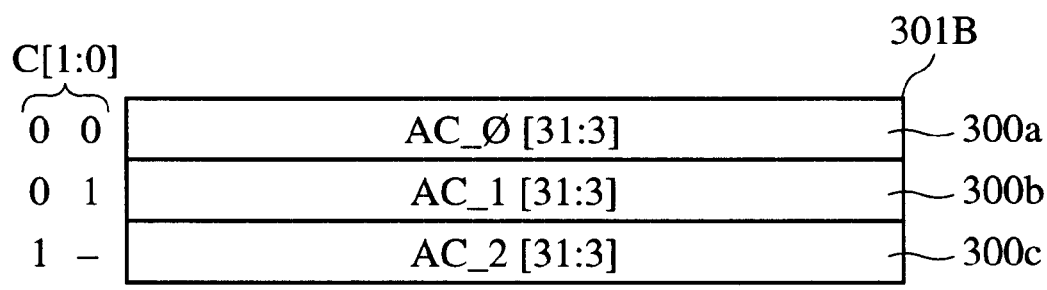
FIG. 17 is a schematic diagram of an address memory used in the multi-channel receive circuit of FIG. 16.

Communication controller 102 generates a 32-bit address signal A[31:0] which is provided to the data input port of Rx_ADDR FIFO 301B. FIG. 17 is a schematic diagram of Rx_ADDR FIFO 301B, which includes three 32-bit entries 300a, 300b and 300c. Entries 300a, 300b and 300c are addressed by the channel signal C[1:0] as illustrated.

The upper 29 address bits A[31:3] of address signal A[31:0] are provided to a first input port of comparator 306B. The cache address for the selected channel is read out of Rx_ADDR FIFO 301B as the 32-bit cache address signal AC[31:0]. The upper 29 bits of this cache address signal AC[31:3] are provided to a second input port of comparator 306B. Comparator also receives the channel signal bit C[1]. Comparator 306B compares the upper 29 bits of cache address signal AC[31:3] to the upper 29 bits of the initial address signal A[31:3] if the channel signal C[1] has a "0" value (i.e., channel 0 or channel 1 is selected). Comparator 306B compares the upper 28 bits of cache address signal AC[31:4] to the upper 28 bits of the initial address signal A[31:4] if the channel signal C[1] has a "1" value (i.e., channel 2 is selected). This difference is necessitated because channel 2 includes sixteen data entries, as compared with the eight data entries for each of channels 0 and 1. Comparator 306B asserts the MATCH signal upon detecting a match. The MATCH signal is provided to communication controller 102, which controls receiver circuit 103B in the manner previously described in connection with FIG. 11.

Rx_DATA FIFO 302B is addressed as follows. FIG. 18 is a schematic diagram of Rx_DATA FIFO 302B, which includes 32 entries, with each entry having 32 bits. The 32 entries are partitioned into three channels which are accessed in response to the channel signal C[1:0]. Table 9 identifies the channels corresponding to the channel signal C[1:0].

TABLE 9

| C [1:0] | Channel |
|---|---|
| 0 0 | Channel 0 |
| 0 1 | Channel 1 |
| 1 X | Channel 2 |

Channels 0 and 1 of Rx_DATA FIFO 302B are each capable of storing up to eight data values. Channel 2 of Rx_DATA FIFO 302B is capable of storing up to sixteen data values. Rx_DATA FIFO 302B is accessed at the write port by write access signals W[4:0], and the read port by read access signals R[4:0].

The write access signals W[4:0] are determined as follows. The write access signals W[2:0] correspond to address bits A[2:0]. Address bit A[3] is routed through multiplexer 317 as the write access signal W[3] when the channel signal bit C[1] has a logic 1 value (i.e., when channel 2 is selected). Channel signal bit C[0] is routed through multiplexer 317 as the write access signal W[3] when the channel signal bit C[1] has a logic 0 value (i.e., when channels 0 and 1 are selected). The write access signal W[4] is set equal to the channel signal bit C[1]. Such an addressing scheme enables data values to be written to the appropriate channel and entry locations within Rx_DATA FIFO 302B.

The read access signals R[4:0] are determined as follows. Four bits stored in incrementer circuit 305B are provided as read address bits RA[3:0]. Read address bits RA[2:0] are provided to Rx_DATA FIFO 302B as read access signals R[2:0]. The read address bit RA[3] is routed through multiplexer 316 when the channel signal bit C[1] has a logic 1 value (i.e., when channel 2 is being accessed). The channel signal bit C[0] is routed through multiplexer 316 when the channel signal bit C[1] has a logic 0 value (i.e., when channel 0 or 1 is being accessed). The channel signal bit C[1] is provided to RX_DATA FIFO 302B as read access signal R[4]. Such an addressing scheme enables data values to be read from the appropriate channel and entry locations within Rx_DATA FIFO 302B.

The four bits stored in incrementer circuit 305B (i.e., read address bits RA[3:0]) are determined as follows. Communication controller 102 asserts the START signal upon detecting that the MATCH signal is in a logic high state and the EMPTY signal of the selected channel is in a logic high state. In response to the asserted START signal, PCI system 101 asserts the LOAD signal, thereby causing the cache address signal AC[31:0] of the selected channel to be loaded into address generator 304B. The four least significant bits of the cache address signal AC[31:0] are loaded into incrementer circuit 305B and incremented by one each time the PCI system 101 asserts the CC signal.

Although the invention has been described in connection with several embodiments, it is understood that this invention is not limited to the embodiments disclosed, but is capable of various modifications which would be apparent to one of ordinary skill in the art. Thus, the invention is limited only by the following claims.

What is claimed is:

1. A communication system comprising:
   a first system having a memory;
   a communication controller; and
   a data transfer circuit coupling the communication controller to the first system, wherein the data transfer circuit is programmable to provide a selectable number of communication channels between the first system and the communication controller.

2. The communication system of claim 1, wherein the data transfer circuit is further programmable to provide a selectable number of entries in each of the communication channels.

3. The communication system of claim 2, wherein at least two of the communication channels have different numbers of entries.

4. The communication system of claim 2, wherein each of the communication channels has the same number of entries.

5. The communication system of claim 1, wherein the data transfer circuit comprises:
   a multi-channel transmit circuit for routing data values from the communication controller to the first system; and
   a multi-channel receive circuit for routing data values from the first system to the communication controller.

6. The communication system of claim 5, wherein the multi-channel transmit circuit comprises:
   a transmit address memory coupled to receive address signals from the communication controller, the transmit address memory having a plurality of cache address entries, wherein each of the cache address entries corresponds to one of the communication channels;
   a comparator coupled to receive the address signals from the communication controller and a cache address entry corresponding to a selected communication channel from the transmit address memory, wherein the comparator causes the first system to be accessed in response to the address signals when the address signals do not match the cache address entry.

7. A communication system comprising:
   a first system having a memory;
   a communication controller; and
   a data transfer circuit coupling the communication controller to the first system, wherein the data transfer circuit is programmable to provide a selectable number of communication channels between the first system and the communication controller, the data transfer circuit comprising:
      a multi-channel transmit circuit for routing data values from the communication controller to the first system; and
      a multi-channel receive circuit for routing data values from the first system to the communication controller;
   the multi-channel transmit circuit comprising:
      a transmit address memory coupled to receive address signals from the communication controller, the transmit address memory having a plurality of cache address entries, wherein each of the cache address entries corresponds to one of the communication channels;
      a comparator coupled to receive the address signals from the communication controller and a cache address entry corresponding to a selected communication channel from the transmit address memory, wherein the comparator causes the first system to be accessed in response to the address signals when the address signals do not match the cache address entry; and
      an address generator coupled to the comparator and the transmit address memory, wherein the cache address entry is loaded into the address generator as an initial access address when the address signals do not match the cache address entry.

8. The communication system of claim 7, wherein the address generator is further coupled to the first system, wherein the address generator is incremented in response to a clock signal provided by the first system.

9. The communication system of claim 7, further comprising means for accessing a sequence of data values within the first system in response to the initial address signal, and providing these data values to the transmit circuit.

10. The communication system of claim 9, wherein the transmit circuit further comprises a plurality of transmit counters, wherein each of the transmit counters corresponds to one of the communication channels and maintains a count of the data values provided to the transmit circuit from the first system for the corresponding communication channel, each transmit counter providing a control signal to the first system when a predetermined number of data values have been provided to the transmit circuit.

11. The communication system of claim 10, wherein the transmit counters are initially reset.

12. The communication system of claim 10, wherein the transmit counters are initially loaded with one or more of the least significant bits of the address signals provided by the communication controller.

13. The communication system of claim 9, wherein the transmit circuit further comprises:
a transmit data memory coupled to receive the data values from the first system, the transmit data memory being addressed by the address generator and a channel control signal provided by the communication controller.

14. The communication system of claim 5, wherein the transmit circuit includes a first in, first out (FIFO) memory which is logically partitioned to provide a plurality of communication channels between the communication controller and the first system.

15. The communication system of claim 5, wherein the multi-channel receive circuit comprises:
a receive address memory coupled to receive address signals from the communication controller, the receive address memory having a plurality of cache address entries, wherein each of the cache address entries corresponds to one of the communication channels;
a comparator coupled to receive the address signals from the communication controller and a cache address entry corresponding to a selected communication channel from the receive address memory, wherein the comparator causes the first system to be accessed in response to the address signals when the address signals do not match the cache address entry.

16. A communication system comprising:
a first system having a memory;
a communication controller; and
a data transfer circuit coupling the communication controller to the first system, wherein the data transfer circuit is programmable to provide a selectable number of communication channels between the first system and the communication controller, the data transfer circuit comprising:
a multi-channel transmit circuit for routing data values from the communication controller to the first system; and
a multi-channel receive circuit for routing data values from the first system to the communication controller;
the multi-channel receive circuit comprising:
a receive address memory coupled to receive address signals from the communication controller, the receive address memory having a plurality of cache address entries, wherein each of the cache address entries corresponds to one of the communication channels;
a comparator coupled to receive the address signals from the communication controller and a cache address entry corresponding to a selected communication channel from the receive address memory, wherein the comparator causes the first system to be accessed in response to the address signals when the address signals do not match the cache address entry; and
an address generator coupled to the comparator and the receive address memory, wherein the cache address entry is loaded into the address generator as an initial access address when the address signals do not match the cache address entry.

17. The communication system of claim 16, wherein the address generator is further coupled to the first system, wherein the address generator is incremented in response to a clock signal provided by the first system.

18. The communication system of claim 16, further comprising means for writing a sequence of data values from the communication controller to the first system in response to the initial address signal.

19. The communication system of claim 18, wherein the receive circuit further comprises a plurality of receive counters, wherein each of the receive counters corresponds to one of the communication channels and maintains a count of the data values written to the first system for the corresponding communication channel, each receive counter providing a control signal to the first system when a predetermined number of data values have been written to the first system.

20. The communication system of claim 19, wherein the receive counters are initially reset.

21. The communication system of claim 18, wherein the receive circuit further comprises:
a receive data memory coupled to receive the data values from the communication controller, the receive data memory being addressed by the address generator and a channel control signal provided by the communication controller.

22. A method of operating a data transfer system coupled between a first system and a communication controller, the method comprising the step of programming the data transfer system to provide a plurality of parallel communication channels between the first system and the communication controller, wherein the number of channels is programmable.

23. The method of claim 22, further comprising the step of programming the data transfer circuit to provide one or more memory entries for each of the channels, wherein the number of entries per channel is programmable.

24. A method of operating a data transfer system coupled between a first system and a communication controller, the method comprising the steps of:
defining a plurality of parallel communication channels within the data transfer system between the first system and the communication controller;
selecting one of the channels for transmitting data values from the first system to the communication controller;
providing an initial address signal from the communication controller to the data transfer system;
determining whether the initial address signal matches a cache address signal stored in the data transfer system for the selected channel;
providing the initial address signal to the first system and updating the cache address signal for the selected channel to correspond to the initial address signal, if the initial address signal does not match the cache address signal for the selected channel;
retrieving a plurality of data values from the first system via the selected channel in response to the initial address signal;
storing the plurality of data values in a memory which corresponds to the selected channel within the data transfer system; and then
providing a data value in the memory to the communication controller when a subsequent address signal from the communication controller matches a cache address signal stored in the data transfer system for the selected channel.

25. A method of operating a data transfer system coupled between a first system and a communication controller, the method comprising the steps of:

defining a plurality of parallel communication channels within the data transfer system between the first system and the communication controller;

selecting one of the channels for transmitting data values from the first system to the communication controller;

providing an initial address signal from the communication controller to the data transfer system;

determining whether the initial address signal matches a cache address signal stored in the data transfer system for the selected channel;

providing the initial address signal to the first system and updating the cache address signal for the selected channel to correspond to the initial address signal, if the initial address signal does not match the cache address signal for the selected channel;

presetting a counter corresponding to the selected channel with one or more of the least significant bits of the initial address signal;

retrieving a plurality of data values from the first system via the selected channel in response to the initial address signal;

incrementing the counter when a data value is transferred from the first system to the data transfer system via the selected channel;

storing the plurality of data values in a memory which corresponds to the selected channel within the data transfer system; and then providing a data value in the memory to the communication controller when a subsequent address signal from the communication controller matches a cache address signal stored in the data transfer system for the selected channel.

26. A method of operating a data transfer system coupled between a first system and a communication controller, the method comprising the steps of:

defining a plurality of parallel communication channels within the data transfer system between the first system and the communication controller;

selecting one of the channels for transmitting data values from the communication controller to the first system;

resetting a counter corresponding to the selected channel;

providing an initial address signal from the communication controller to the data transfer system;

determining whether the initial address signal matches a cache address signal stored in the data transfer system for the selected channel;

if the initial address signal does not match the cache address signal for the selected channel, then updating the cache address signal for the selected channel to correspond to the initial address signal and providing a first data value corresponding to the initial address signal for storage in the data transfer system;

providing a second address signal from the communication controller to the data transfer system;

if the second address signal matches the cache address signal, then providing a second data value corresponding to the second address signal for storage in the data transfer system; and transmitting the first and second data values to the first system when a subsequent address signal does not match the cache address signal.

* * * * *